(12) United States Patent
Cannata et al.

(10) Patent No.: US 12,265,480 B2
(45) Date of Patent: Apr. 1, 2025

(54) DYNAMIC SERVER REBALANCING

(71) Applicant: Liqid Inc., Broomfield, CO (US)

(72) Inventors: James Scott Cannata, Denver, CO (US); Allen R. Andrews, Broomfield, CO (US); Henry Lee Harris, Redding, CA (US)

(73) Assignee: Liqid Inc., Westminster, CO (US)

( * ) Notice: Subject to any disclaimer, the term of this patent is extended or adjusted under 35 U.S.C. 154(b) by 197 days.

(21) Appl. No.: 17/831,518

(22) Filed: Jun. 3, 2022

(65) Prior Publication Data

US 2023/0169017 A1 Jun. 1, 2023

Related U.S. Application Data

(60) Provisional application No. 63/321,274, filed on Mar. 18, 2022, provisional application No. 63/284,089, filed on Nov. 30, 2021.

(51) Int. Cl.
*G06F 13/10* (2006.01)

(52) U.S. Cl.
CPC .......... *G06F 13/102* (2013.01); *G06F 13/105* (2013.01)

(58) Field of Classification Search
None
See application file for complete search history.

(56) References Cited

U.S. PATENT DOCUMENTS

| | | |
|---|---|---|
| 10,452,570 B1 | 10/2019 | Liguori |
| 10,608,819 B1 | 3/2020 | Brown et al. |
| 11,449,963 B1 | 9/2022 | Beeler et al. |
| 2007/0174033 A1 | 7/2007 | Huang et al. |
| 2015/0074322 A1 | 3/2015 | Galles |
| 2015/0234762 A1 | 8/2015 | Townsend |
| 2015/0254193 A1* | 9/2015 | Priest ............. G06F 13/385 710/5 |
| 2019/0087359 A1 | 3/2019 | Litichever et al. |
| 2021/0390118 A1* | 12/2021 | Gorkin ............. G06F 16/219 |
| 2022/0075747 A1 | 3/2022 | Shuler et al. |
| 2022/0206964 A1 | 6/2022 | Kim et al. |
| 2022/0308764 A1 | 9/2022 | Pismenny et al. |
| 2022/0309019 A1 | 9/2022 | Duer et al. |

OTHER PUBLICATIONS

International Search Report and Written Opinion for PCT Application No. PCT/US2023/063579, mailed May 26, 2023; 12 pages.
International Search Report & Written Opinion for PCT Application PCT/US2023/06735, mailed Feb. 21, 2023; 10 pages.

\* cited by examiner

*Primary Examiner* — Scott C Sun

(57) ABSTRACT

Enhanced apparatuses, systems, and techniques are presented for coupling remote peripheral devices located at a host device, as local peripheral devices of a client device. A method includes receiving an indication of a peripheral device, located at a first computing device, that is available for data processing, and receiving a request from a second computing device to access the peripheral device. Based on the request, the method may include directing the second computing device to emulate the peripheral device as a local device installed into the second computing device, and routing data traffic from the second computing device to the first computing device for processing by the peripheral device.

9 Claims, 6 Drawing Sheets

DYNAMIC SERVER REBALANCING

RELATED APPLICATIONS

This application hereby claims the benefit of and priority to U.S. Provisional Patent Application 63/321,274, entitled "DYNAMIC SERVER REBALANCING," and filed Mar. 18, 2022. This application also hereby claims the benefit of and priority to U.S. Provisional Patent Application 63/284,089, entitled "LOCAL INSTANTIATION OF REMOTE PERIPHERAL DEVICES," and filed Nov. 30, 2021.

BACKGROUND

Clustered computing systems have become popular as demand for data storage, data processing, and communication handling has increased. Data centers typically include large rack-mounted and network-coupled data storage and data processing systems. These data centers can receive data for storage from external users over network links, as well as receive data as generated from applications that are executed upon processing elements within the data center. Many times, data centers and associated computing equipment can be employed to execute jobs for multiple concurrent users or applications. The jobs include execution jobs which can utilize resources of a data center to process data using central processing units (CPUs) or graphics processing units (GPUs), as well as to route data associated with these resources between temporary and long-term storage, or among various network locations. For example, GPU-based processing has increased in popularity for use in artificial intelligence (AI) and machine learning regimes. In these regimes, computing systems, such as blade servers, can include one or more GPUs along with associated CPUs for processing of large data sets.

However, servers typically include a fixed arrangement between a CPU, GPU, and storage elements which are housed in a common enclosure or chassis. When incoming jobs are deployed within the data center, the granularity for computing resources is limited to individual servers. Thus, deployed jobs typically take up one or more servers along with all of the corresponding CPU, GPU, and storage elements of each server, regardless of whether or not the entire resources of the server are actually needed to execute the jobs. To compensate, operators of data centers typically deploy a continually-increasing quantity of servers to accommodate increasing traffic from jobs. This strategy can encounter barriers on required physical space for rack-mounted servers, as well as the large space and cost requirements.

OVERVIEW

Enhanced apparatuses, systems, and techniques are presented for virtually coupling remotely located peripheral devices, physically coupled to a host computing system, to a client computing system. The peripheral devices may be coupled to the client computing system as local devices, despite the peripheral devices being remotely located at the host device and connected to the client device over communication network links. These enhancements can provide for peripheral devices, such as GPUs, FPGAs, or ASICs (referred to as co-processing units (CoPUs) or data processing accelerators), to be utilized on-demand by client computing systems over network links. These peripheral devices can then be arbitrarily associated and de-associated with various client devices (such as servers or other computing systems) as if the peripheral devices were local peripherals plugged into the client devices. Thus, a client device can add a larger quantity of peripheral devices for use in processing workloads or user data than would normally be feasible compared to physically plugging peripheral devices into a motherboard of the client device. Host devices can share access to physically connected peripheral devices to remote client devices when the peripherals are not in use by the host, thereby more efficiently utilizing all the resources of a computing cluster without costs associated with adding additional servers and space requirements.

In one example implementation, a method may comprise, receiving an indication of a peripheral device available for data processing and located at a first computing device, receiving a request from a second computing device to access the peripheral device, and based on the request, directing the second computing device to emulate the peripheral device as a local device installed into the second computing device. The method may further comprise routing data traffic from the second computing device for processing by the peripheral device at the first computing device.

In another example implementation, a system may comprise a first computing device including a network interface, the first computing device configured to obtain, via the network interface, an indication from a server rebalancing system of a peripheral device available over the network interface for processing, the peripheral device located at a second computing device. The first computing device may issue a request, to the server rebalancing system over the network interface, to access the peripheral device, and based on a response from the server rebalancing system, emulate local installation of the peripheral device at the first computing system. The first computing device may issue data traffic for processing by the peripheral device to the server rebalancing system via the network interface.

In yet another example implementation, a method may comprise issuing, from a first computing device to a server rebalancing system over a network interface, an indication that a peripheral device located at the first computing device is available for processing, and receiving, at the first computing device from the server rebalancing system via the network interface, a second indication that the peripheral device is assigned to a second computing device. The method may further comprise receiving, at the first computing device from the server rebalancing system via the network interface, data traffic from the second computing device for processing by the peripheral device, and providing, from the first computing device via the network interface, a result of processing the data traffic by the peripheral device.

This Overview is provided to introduce a selection of concepts in a simplified form that are further described below in the Technical Disclosure. It should be understood that this Overview is not intended to identify key features or essential features of the claimed subject matter, nor should it be used to limit the scope of the claimed subject matter.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, the disclosure is not limited to the embodiments disclosed herein. On the contrary, the intent is to cover all alternatives, modifications, and equivalents.

FIG. 1 is a diagram illustrating a computing system in an implementation.

DETAILED DESCRIPTION

Figure 1:
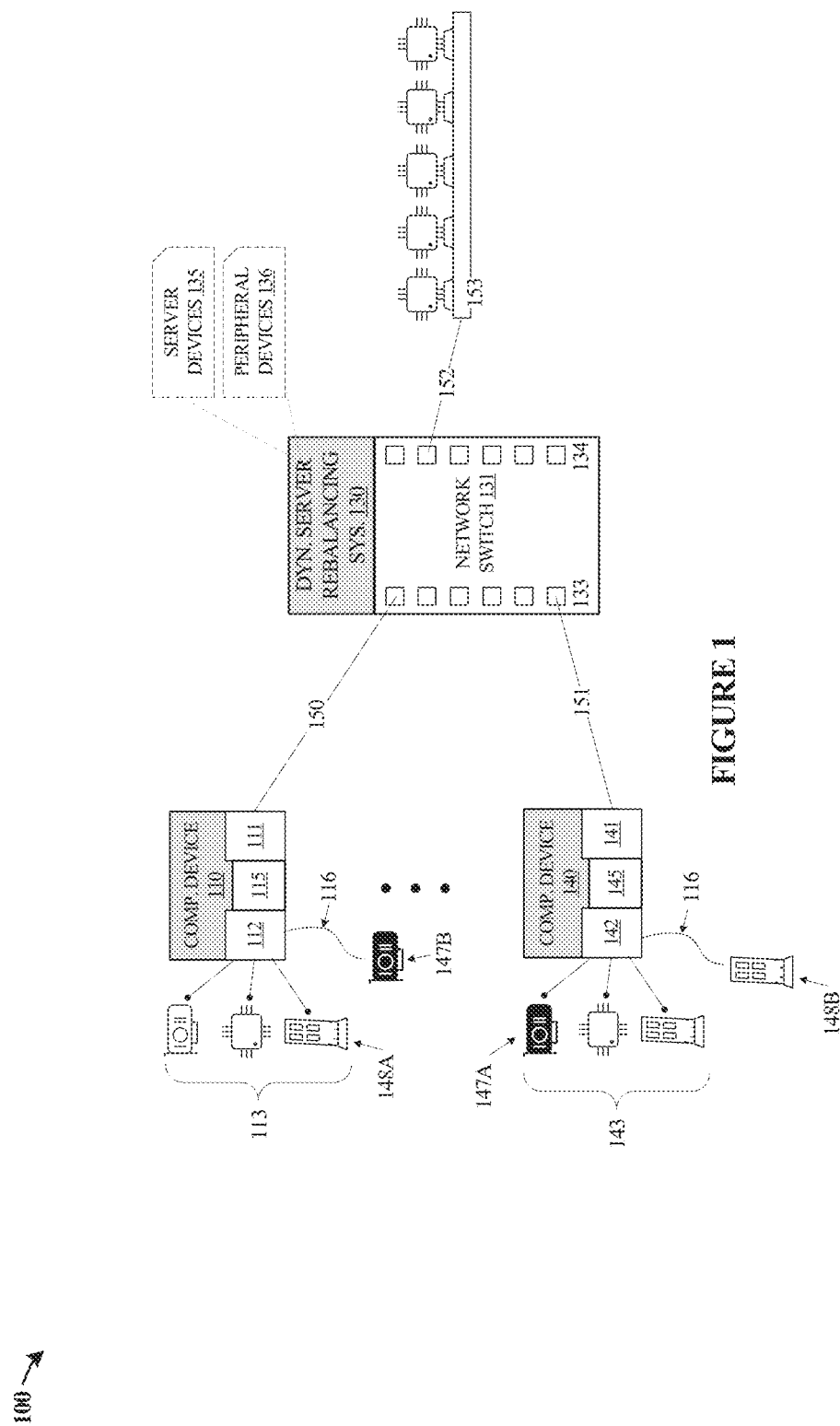

Data centers with associated computing equipment can be employed to handle execution jobs to process data as well as to shuttle data associated with execution jobs between temporary and long-term storage, or among various network destinations. Typically, data centers include large numbers of rack-mounted computing systems, or servers, which are independently packaged, and house corresponding sets of processors, system memory, data storage devices, network interfaces, and other computing equipment coupled over internal data buses. Once installed, these servers are not typically modified or altered, apart from minor upgrades or repairs to individual components to replace existing components. This relatively fixed arrangement of a server can be referred to as being in a converged arrangement. Thus, each server represents a granular unit of computing equipment, with individual internal components largely unaltered once encased by a server manufacturer and inserted into a rack by a system installer.

The limitations of discrete server-based computer systems can be overcome using disaggregated physical components and peripheral devices which can dynamically be attached to client computing systems while not being locally-coupled to local data buses of such client systems. Instead of having a fixed arrangement between a computing device and peripheral devices, in which the entire computing system is housed in a common enclosure or chassis, the examples herein can flexibly include any number of peripheral devices that span any number of enclosures/chassis and are dynamically formed into logical arrangements over a communication fabric or network. Moreover, in addition to disaggregated components which do not have a traditional server-motherboard relationship, various example converged computing systems discussed herein can make unused locally-connected data processing resources and peripheral devices available to other converged computing devices. For example, a peripheral device of a host computing system can be emulated as being locally-mounted or locally-installed into a client computing system for use, even though the client is accessing the device remotely via a network. Thus, a computing system can better utilize resources by not having idle or wasted portions of a converged server which are not needed for a particular task or for a particular part of a task, and instead make those idle components available for use by other computing devices. A data center operator can achieve very high utilization levels for a data center, greater than can be achieved using fixed-arrangement servers, and can augment existing servers with additional capabilities over pre-existing network connections. These operations and techniques can be referred to as dynamic server rebalancing.

The systems and operations discussed herein provide for dynamic rebalancing and assignment of peripheral resources of individual computing devices, such as computing resources (CPUs), graphics processing resources (GPUs), network interface resources (NICs), communication fabric interface resources, data storage resources (SSDs), field-programmable gate arrays (FPGAs), and system memory resources (RAM), among and between the computing devices, even when the peripheral resources are not locally coupled to the client devices utilizing the resources. Peripheral resources can also include co-processing units (CoPUs) or data processing accelerators, such as GPUs, tensor processing units (TPUs), FPGAs, or application-specific integrated circuits (ASICs). Data processing of host device CPUs augmented by CoPUs has increased in popularity for use in artificial intelligence (AI), machine learning systems, cryptocurrency mining and processing, advanced graphical visualizations, biological systems modeling, self-driving vehicle systems, and other various tasks.

In one instance, the peripheral resources may be disaggregated and established as a pool of unused, unallocated, or free peripheral resources until allocated (composed) to requesting client devices using a communication fabric, such as Peripheral Component Interconnect Express (PCIe) or Compute Express Link (CXL). A management processor, or dynamic server rebalancing system, can control composition and de-composition among connected servers and computing systems, and provide interfaces to external users, job management software, or orchestration software. Peripheral resources and other elements (graphics processing, network, storage, FPGA, RAM, or other) can be made available by a host device, and attached/detached in and out of various client devices on-the-fly. In another instance, the peripheral resources may be located within enclosures of individual servers. These peripheral resources can be established into a pool as mentioned above for disaggregated components, but instead are physically associated with individual servers. Through the use of the enhanced techniques discussed herein, components located within a first server can be used for activities of a second server as if those components were local devices to that second server. For example, graphics processing resources physically attached to a host device can be assigned, via a dynamic server rebalancing system, to be virtually attached to a first client device, and then later detached from the first client device and assigned to a second client device. In another example, if a resource experiences failures, hangs, overloaded conditions, then additional peripheral resources from other host devices can be introduced to a client device to supplement existing resources.

As a first example system, FIG. 1 is presented. FIG. 1 is a system diagram illustrating computing system 100 which employs dynamic server rebalancing techniques that can encompass both disaggregated computing components and converged servers. System 100 includes computing devices 110 and 140, dynamic server rebalancing system 130, network switch 131, and disaggregated peripheral devices 153. Computing devices 110 and 140 can communicate over network links 150-151 with network switch 131. Peripheral devices 153 communicate over communication fabric link 152 with network switch 131. Although only two computing devices are shown in FIG. 1, it should be understood that any number of computing devices can be included and coupled to network switch 131 over associated network links.

Computing devices 110, 140 include network interfaces 111, 141, local peripheral interconnect interfaces 112, 142, and peripheral over fabric (PoF) systems 115, 145. Network interfaces 111, 141 may be coupled over network links 150-151 to network switch 131. Local interfaces 112, 142 may be coupled over local links to local peripheral devices 113, 143. For ease of description, computing device 110 and its associated components and connections will be described hereafter, but the same functionality may apply to computing device 140 unless otherwise noted. PoF system 115 may be coupled to both network interface 111 and local interface 112 over software and hardware connections, such as via software interfaces into associated protocol stacks or programming interfaces of network interface 111 and local interface 112.

In operation, computing device 110 can execute system software and user applications for various tasks using on-board central processing units (CPUs) along with peripheral devices including graphics processing devices (e.g. GPUs), data storage devices (e.g. SSDs), memory devices (e.g. DRAM), network interfaces (e.g. NICs), and user interface devices. Operators of computing device 110, or the OS or other components of computing device 110, may desire to add additional peripheral devices for use by the computing device 110. Conversely, computing device 110 may indicate that it has local resources or peripheral devices that are idle or otherwise available for use by other computing devices in system 100. To facilitate making local peripheral devices available remotely to other computing device, and the addition of remote peripheral devices into a computing device without physically plugging such peripheral devices into the computing device, various enhanced techniques and systems are presented herein. Peripheral devices including data processing elements (such as CoPUs) or other peripheral devices (such as data storage or memory devices) can be configured to be associated with computing device 110 even though such devices or elements are not physically local to computing device 110. Elements included on computing device 110 as well as in dynamic server rebalancing system 130 can enable remote sharing or adding of peripheral devices for use by computing device 110 as if the remote peripheral devices were local devices coupled over a local interface, such as a PCIe interface. Although PCI/PCIe connections are referenced herein as an example of a common peripheral device communication protocol, it should be understood that other peripheral device protocols may be used without departing from the scope of this disclosure, such as CXL. Through the remote sharing of peripheral devices and other resources among computing devices, arbitrary associations between any of peripheral devices 113, 143, and 140, and any of host devices 110 and 140, can be made and changed on-the-fly. These associations are made over the network interfaces of computing device 110, and optionally communication interfaces that couple to peripheral devices 140, as will be discussed in more detail below.

Turning now to a discussion on the elements of FIG. 1, host device 110 comprises a computing system having processing elements, data storage and memory elements, and user interface elements. Examples of host device 110 include servers, blade servers, desktop computers, laptop computers, tablet computers, smartphones, gaming systems, elements of a distributed computing system, customer equipment, access terminals, Internet appliances, media players, or other computing systems. Typically, host device 110 will include a motherboard or other system circuit board having a central processing unit (CPU) coupled thereto along with memory devices, such as random access memory (RAM) or dynamic RAM (DRAM). The CPU can be a component in a processing system formed from among one or more microprocessor elements including Intel® microprocessors, Apple® microprocessors, AMD® microprocessors, ARM® microprocessors, field-programmable gate arrays (FPGAs), application specific integrated circuits (ASICs), tensor processors, application specific processors, or other microprocessors or processing elements. Various peripheral devices 113 can physically couple locally to peripheral interconnect interfaces 112 of host device 110 via corresponding slots, connectors, or over cabling within an enclosure or chassis of host device 110. These peripheral devices 113 can include graphics cards housing graphics processing units (GPUs), data storage drives using various computer-readable media, network interface controllers (NICs) having physical layer elements to couple to network links (e.g., Ethernet), or other devices including user interface devices. For example, PCIe devices might be included in host device 110 which are coupled into PCIe slots on a motherboard of host device 110. Such devices 113 are referred to as local peripheral devices. Host device 110 also includes various software which is executed by a processing system of host device 110. This software typically includes operating systems, user applications, device drivers, user data, hypervisor software, telemetry software, or other various software elements.

Figure 4:
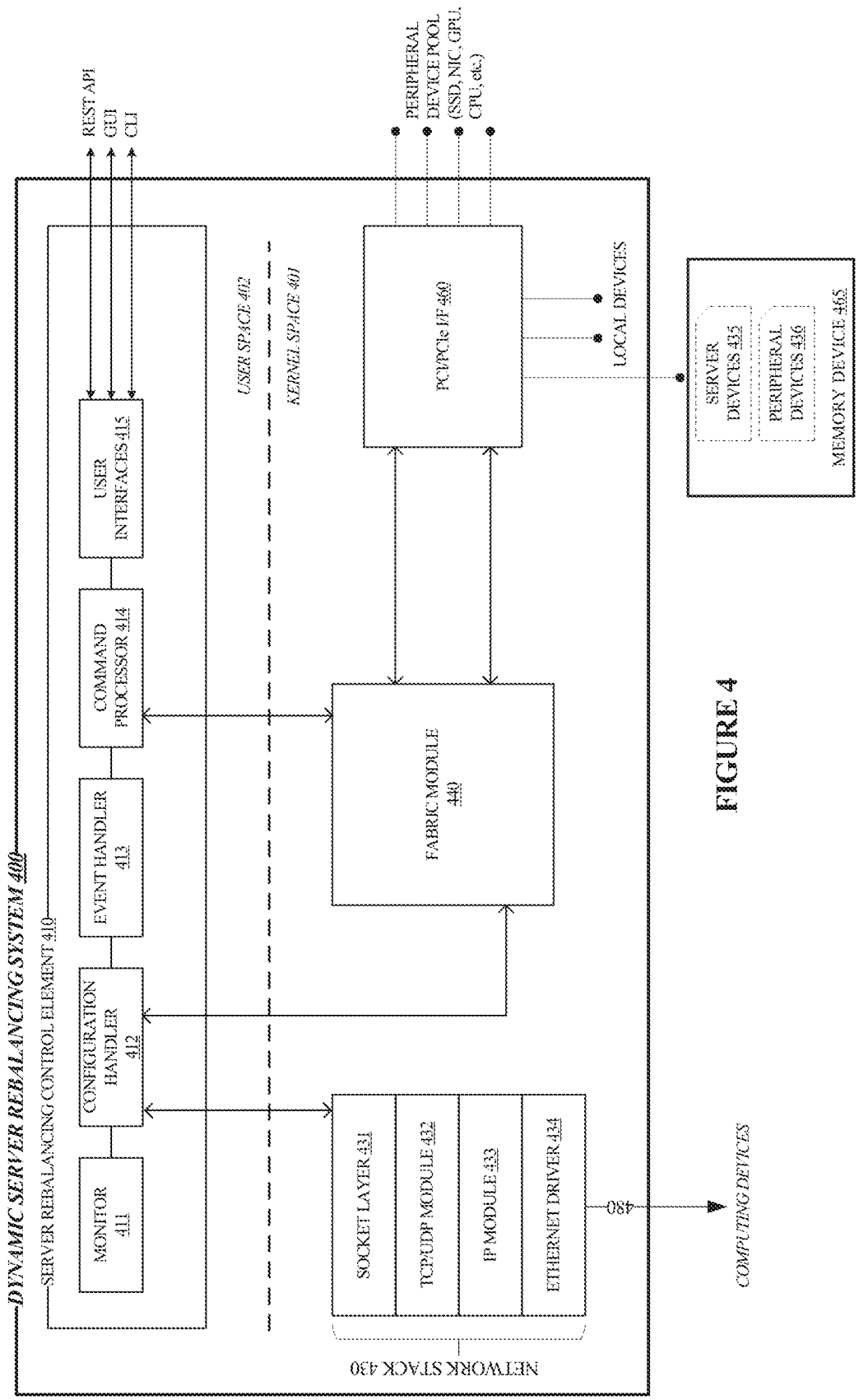
FIG. 4 is a diagram illustrating a fabric control system in an implementation.
Figure 5:
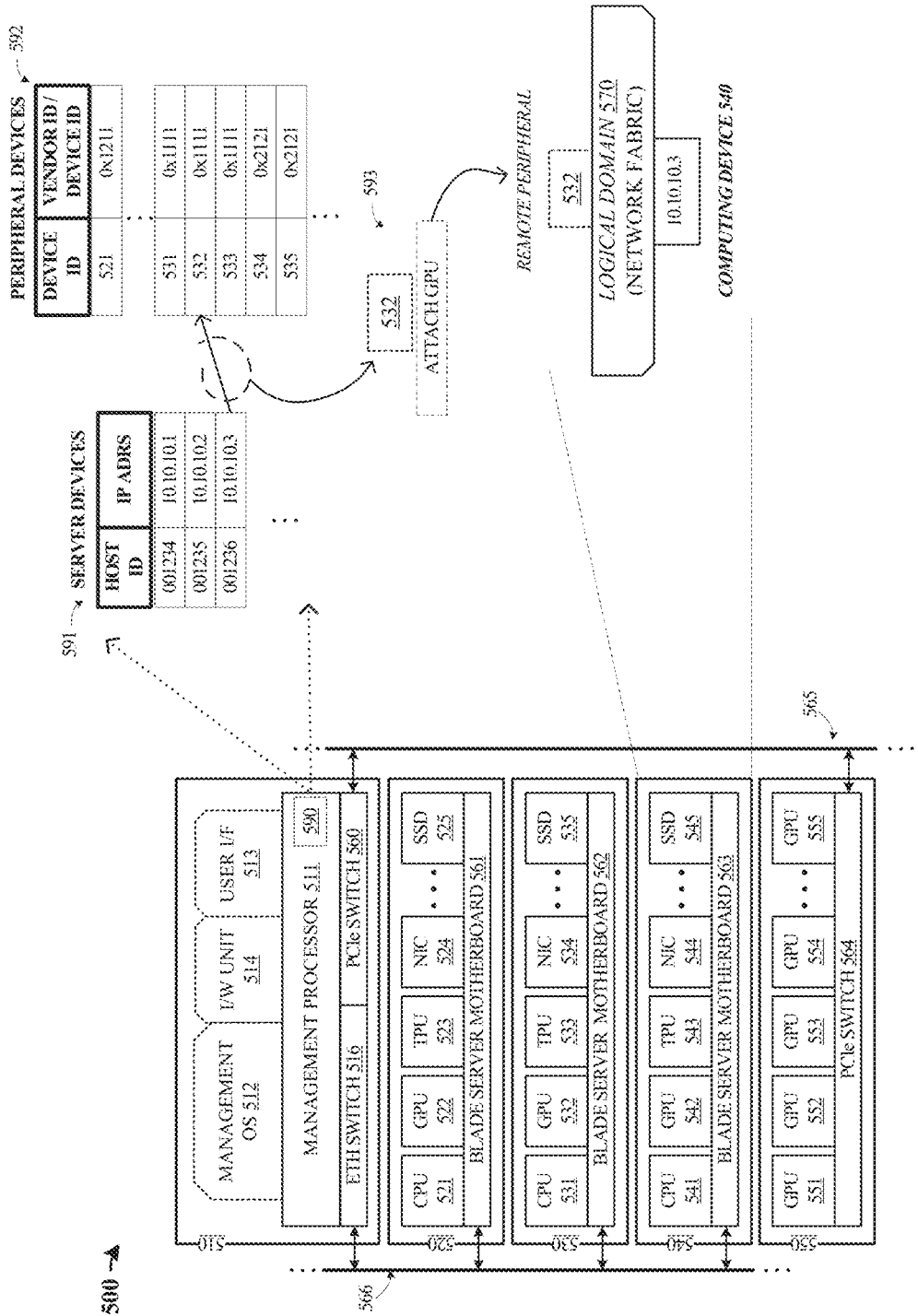
FIG. 5 is a diagram illustrating a computing system in an implementation.
Figure 6:
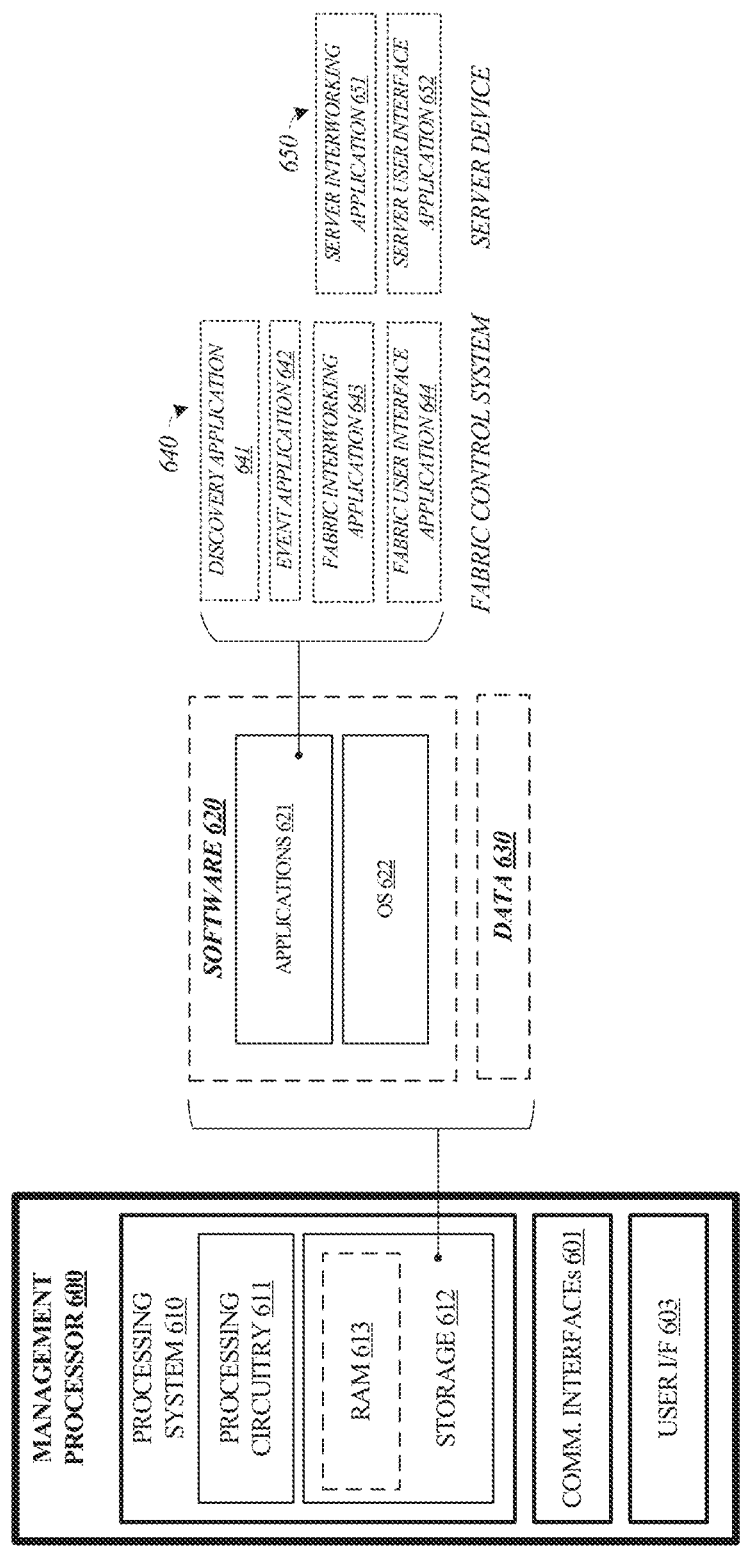
FIG. 6 is a diagram illustrating a control system in an implementation.

Dynamic server rebalancing system 130, sometimes referred to as a control system, control module, management system, management processor, or fabric control system, comprises control and interworking elements for network switch 131. Dynamic server rebalancing system 130 can be included in a top-of-rack (ToR) switch chassis or other network switching or routing element. Dynamic server rebalancing system 130 comprises a management operating system (OS), operator control interfaces, and various other elements—such as shown in FIGS. 4-6. Dynamic server rebalancing system 130 can comprise one or more microprocessors and other processing circuitry that retrieves and executes software from an associated storage system (not shown). Dynamic server rebalancing system 130 can be implemented within a single processing device, but can also be distributed across multiple processing devices or subsystems that cooperate in executing program instructions. Examples of dynamic server rebalancing system 130 include general purpose central processing units, application specific processors, and logic devices, as well as any other type of processing device, combinations, or variations thereof. In some examples, dynamic server rebalancing system 130 comprises an Intel® microprocessor, Apple® microprocessor, AMD® microprocessor, ARM® microprocessor, FPGA, ASIC, application specific processor, or other microprocessor or processing elements. Dynamic server rebalancing system 130 includes at least one network interface, and in some examples at least one fabric interface. The network interface comprises a network stack and associated physical layer interfaces used to communicate with network switch 131 and control elements of network switch 131, as well as communicate with devices coupled to ports 133 of network switch 131. A fabric interface may comprise a communication link subsystem used to communicate with network switch 131 and between peripheral devices coupled to ports 134. The fabric interface may comprise one or more PCIe interfaces or other suitable fabric interfaces.

Network switch 131 includes network ports 133 that provide switched network connections for computer devices, such as shown for network links 150-151. Network switch 131 includes various network switching circuity to communicatively link individual ports to other ports based on traffic patterns, addressing, or other traffic properties. In one example, network switch 131 comprises an Ethernet or Wi-Fi (802.11xx) switch corresponding to wired or wireless connections, which can refer to any of the various network communication protocol standards and bandwidths available, such as 10BASE-T, 100BASE-TX, 1000BASE-T, 10GBASE-T (10GB Ethernet), 40GBASE-T (40GB Ethernet), gigabit (GbE), terabit (TbE), 200 GbE, 400 GbE, 800 GbE, or other various wired and wireless formats and speeds.

Network switch 131 optionally includes fabric ports 134, which may be a part of a separate fabric switch element which communicates with dynamic server rebalancing system 130 over a fabric port. Fabric ports 134 may couple to peripheral devices 153 over associated fabric links 152, typically comprising point-to-point multi-lane serial links. Types of fabric ports and links include PCIe, Gen-Z, InfiniBand, NVMe, FibreChannel, NVLink, Cache Coherent Interconnect for Accelerators (CCIX), Compute Express Link (CXL), and Open Coherent Accelerator Processor Interface (OpenCAPI), among others. In FIG. 1, fabric ports 134 are shown coupled to a set or group of peripheral devices 153, where that group includes individual peripheral devices coupled to a backplane which has a shared fabric connection to fabric ports 134 over link 152. Although a single group of uniform peripheral devices 153 is shown (e.g., just a box of GPUs, JBOG), it should be understood that any number of groups in any arbitrary arrangement of peripheral devices can instead be employed, and that individual peripheral devices can be coupled to fabric ports 134 without the use of a shared backplane.

Peripheral devices 113, 143, and 153, as mentioned above, can comprise various co-processing units (CoPUs) or data processing accelerators, such as graphics processing units (GPUs), tensor processing units (TPUs), field-programmable gate arrays (FPGAs), or application-specific integrated circuits (ASICs). Peripheral devices can also include data storage devices, such as solid state storage devices (SSDs) that include flash memory or other media types, hard drives (HDDs) including rotating magnetic media, magnetoresistive random-access memory (MRAM), or other data storage devices having various media types and interface types. Peripheral devices can include fabric-coupled memory devices, such as dynamic random-access memory (DRAM), static random-access memory (SRAM), 3D XPoint memory, solid state memory devices, magnetic random-access memory (MRAM) devices, or other various memory devices. Peripheral devices can include network interface controllers (NICs) including various network interface elements such as physical layer elements (PHY), transport layer elements, TCP/IP traffic handling elements, routers, switches, or bridges, along with associated cable connectors.

Figure 2:
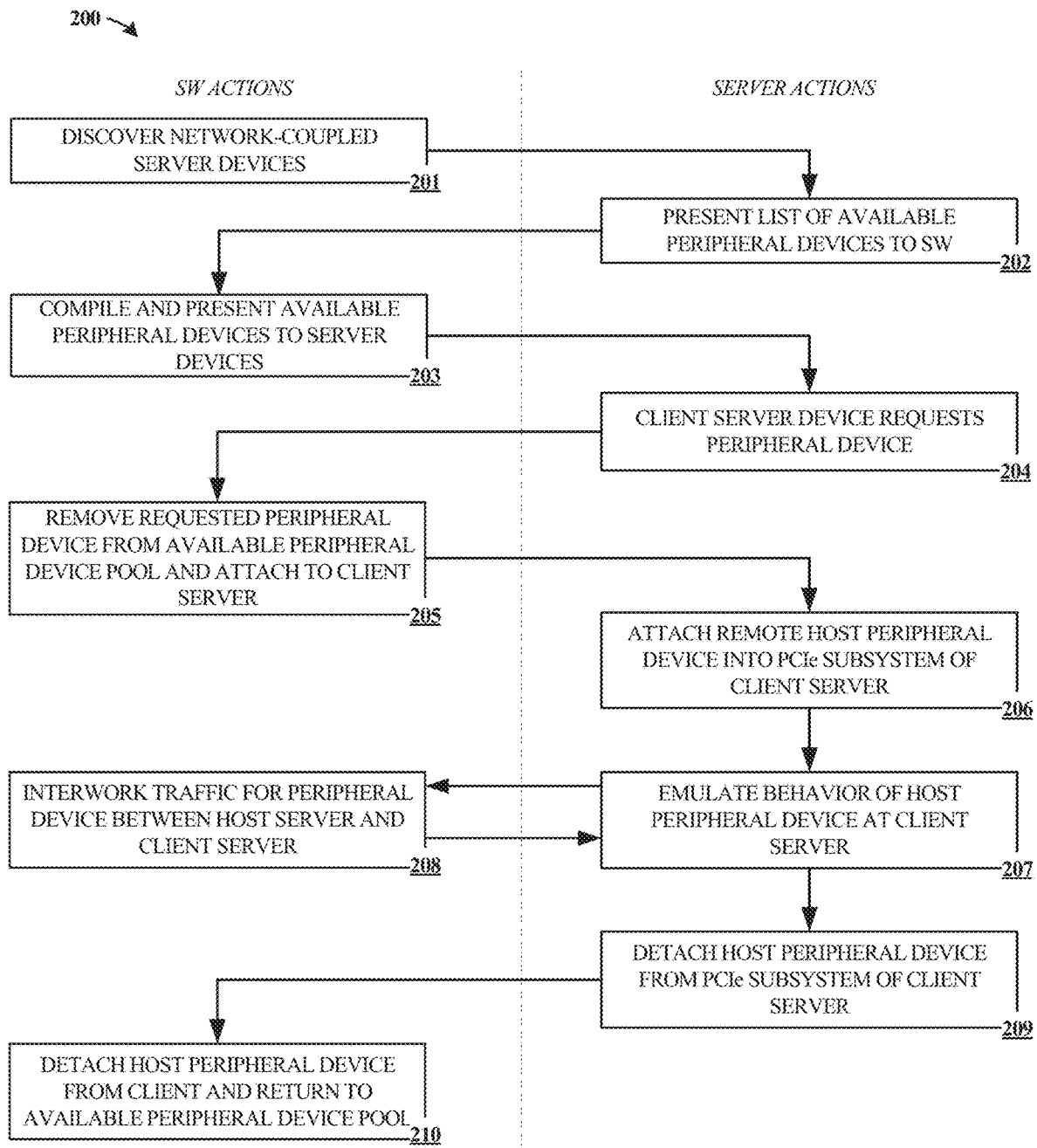
FIG. 2 includes a flow diagram that illustrates an operational example of a computing system in an implementation.

Turning now to an example set of operations for the elements of FIG. 1, operations 200 are presented in FIG. 2. Operations 200 can be subdivided into those performed by dynamic server rebalancing system 130 (labeled as switch (SW) actions), and those performed by computing device 110 (labeled as server actions), although the various operations might be performed by different devices than listed in FIG. 2.

In operation 201, dynamic server rebalancing system 130 discovers network-coupled server devices, such as computing device 110. The dynamic server rebalancing system may receive initialization messaging provided by computing device 110, such as device identifiers (ID), vendor IDs, addressing, and other information. This information can be provided automatically by computing devices 110 upon power up or reset (e.g., initiated as a server 110 action instead of as a dynamic server rebalancing system 130 action), or can be queried by dynamic server rebalancing system 130 using various protocol-specific commands or control traffic. A communication protocol or handshaking operation can be employed between server device 110 and dynamic server rebalancing system 130 which indicates a host IP address, a port number, and a login/password for server device 110 such that dynamic server rebalancing system 130 can issue attach/detach operations to server device 110.

Regardless of the technique used to discover individual server devices over link 150, dynamic server rebalancing system 130 can establish and maintain one or more data structures which list these properties and identifiers for the server devices along with the corresponding IP address, port number, login/password parameters. One example data structure is noted as "server devices 135" in FIG. 1. Dynamic server rebalancing system 130 can update this data structure over time to add or remove server devices as changes to their operational status, presence, or availability change. A similar discovery process may be performed to discover peripheral devices 153 over link 152.

In some examples, dynamic server rebalancing system 130 may discover many network devices, but only catalog computing devices 110 which support network-coupled peripheral device modes through use of specialized software, firmware, or hardware deployed to such computing devices 110, e.g., such as PoF module 115. This specialized module, such as a driver or kernel-level module, can report statuses to dynamic server rebalancing system 130 which include mode support indications to dynamic server rebalancing system 130 along with server-associated network addresses, network ports, or network sockets.

In response to discovery process between the dynamic server rebalancing system 130 and the server device 110, the server device 110 (or one or more modules therein) may generate and present (202) to the dynamic server rebalancing system a list of available peripheral components physically located at the server device 110. The list may include all peripheral components at the server device 110, or may be limited to peripheral components that are idle or otherwise available for use by other computing systems. In some examples, the server device 110 may report resources in addition to peripheral devices, including storage capacity or processing resources that does not involve making an entire component or peripheral device available. For example, a server device 110 may make a portion of its CPU processing capacity available while retaining a portion of the processing capacity for itself, such as by using virtualization. The list of peripheral devices may include device identifiers (ID), vendor IDs, addressing, performance specifications or requirements, and other information by which the peripheral devices may be identified for accessing. For example, the server device 110 may include a plurality of network ports, and may dedicate different ports to one or more peripheral devices. In embodiments where multiple peripheral devices can be accessed via a single port, access requests can use device identifiers or other information to inform the server device 110 what peripheral is being accessed.

At 203, based on receiving the list of available peripheral devices from server device 110, and optionally from a discovery operation for additional peripheral devices 153, the dynamic server rebalancing system 130 may compile a data structure of available peripheral devices. An example data structure is shown in FIG. 1 as "peripheral devices 136". The peripheral devices data structure 136 may identify a type of resource or peripheral, its specifications, associated server device 110, addressing information and identifiers, port 133 or network connection 150, status (e.g., whether or not the resource is currently in use or assigned to a client server device 110, and which one), or other details. The peripheral device data structure 136 may be incorporated into server devices data structure 135, or maintained separately. The peripheral data structure may be updated by the dynamic server rebalancing system 130 as resources come online or become unavailable, or as peripheral devices are attached/detached to server systems 110. The dynamic server rebalancing system may provide a list of available peripheral devices to server devices 110 connected to network switch 131 over network link 150. The list may be provided to the server devices 110 automatically, for example at fixed intervals or every time the list is updated. In some examples, the list may be provided to a server device 110 in response to a request from the server device to access resources. A subset of the total quantity of peripheral devices in "peripheral devices 136" can be provided based on a server device 110 requesting only certain types of devices. PoF system 115 of computing device 110 can then make a selection or request of a peripheral device (204), indicated over network interface 111 to dynamic server rebalancing system 130. This selection may indicate an identity or identifier of a peripheral device that server device 110 desires to couple to over network link 150, such as a device ID or vendor ID used to identify the peripheral device on local peripheral interconnect interface 112. By requesting use of a peripheral device, a server device 110 may be considered a "client" server or computing device for that peripheral, while a computing device at which the requested peripheral is physically located may be referred to as a "host" server or computing device. In some examples, a single server device 110 may simultaneously be a "host" for some peripheral devices and a "client" for other peripheral devices. For the purposes of example explanation of FIG. 2, computing device 110 may be the "client" server, while computing device 140 may be the "host" server.

At 205, responsive to the peripheral device selection by client server 110, dynamic server rebalancing system 130 may remove the peripheral device from an available device pool (e.g., of "peripheral devices 136"), and provide one or more commands that instruct PoF system 115 to attach the peripheral device into client system 110. The dynamic server rebalancing system 130 may also send an indication to host system 140 indicating that the peripheral device is occupied or unavailable to host system 140 while the peripheral is attached to client system 110.

Taking peripheral device 147A of host server 140 as an example selected peripheral device, responsive to the instructions issued by dynamic server rebalancing system 130, PoF system 115 performs (206) a hot plug or attach process to instantiate a virtual or emulated version of peripheral device 147A, shown in FIG. 1 as 147B, into local peripheral interconnect interface 112 of client device 110 via virtual connection 116. This hot plug or attach process may comprise triggering an entry point process, emulating to local peripheral interconnect interface 112, that a new hardware device is physically present in a slot or connector of client device 110, when that hardware device is actually not physically present in a slot or connector of client device 110. PoF system 115 may call an entry point process within local peripheral interconnect interface 112 without using any corresponding hardware interrupts or hardware indicators normally resultant from a physical plugging or powering on of a peripheral device into client device 110. This can also include modification of local peripheral interconnect interface 112 to accept interrupts or attach commands from PoF system 115 instead of only from hardware changes. PoF system 115 also emulates the hardware plugging process by providing address space descriptions to local peripheral interconnect interface 112 to access peripheral device 147B as a local peripheral device coupled to client system 110. In examples where local peripheral interconnect interface 112 comprises a PCIe subsystem of client device 110, an 'attach' command might be issued by PoF system 115 which indicates a vendor ID and device ID to the PCIe subsystem. The PCIe subsystem can also request or be provided with memory addressing locations for memory-mapped access to peripheral device 147B. PoF system 115 can emulate these addressing locations and structural properties of such locations (e.g., buffer sizing and formats) to further emulate behavior of physical peripheral device 147A as a virtual peripheral device 147B.

Once instantiated into local peripheral interconnect interface 112 of client device 110, PoF system 115 can emulate (207) the peripheral device 147B at the client server 110. A device driver of client device 110 can interface with peripheral device 147B through local peripheral interconnect interface 112 to provide access to operating system processes, user applications, kernel resources, and other various interfacing. Any tools and libraries associated with the peripheral device driver will function identically for local peripheral devices coupled physically to client device 110 or peripheral devices mapped over a network link through PoF system 115. Thus, a device driver for peripheral device 147B is not typically aware that the actual peripheral device 147A is not locally connected to client device 110. User applications, operating systems, kernel resources, hypervisors, and the like, all can interface with peripheral device 147B as normally done when connected locally—via PoF system 115 emulating behavior of a local hardware interface of peripheral device 147B to local peripheral interconnect interface 112. This emulation can include behavior noted above for instantiation, and also for handling of communications thereafter between local peripheral interconnect interface 112 and network interface 111. These communications can include configuration traffic, command and control handshaking, input/output traffic, and read/write traffic or data transfer between client device 110 and the physical peripheral device 147A located at host device 140. Thus, PoF system 115 acts as an interworking unit for traffic for peripheral device 147A/B between local peripheral interconnect interface 112 and network interface 111. PoF system 115 interfaces with a network stack of network interface 111 to send and receive this traffic to/from the actual peripheral device 147A over network link 150. This can include intercepting client-originated traffic for peripheral device 147B from local peripheral interconnect interface 112, interpreting the client originated traffic to convert or re-bundle from a native format (e.g., PCIe frames or similar of local peripheral interconnect interface 112) into an IP packet format or Ethernet frame format suitable for transfer over network interface 111. Then, PoF system 115 routes the host-originated traffic in the packet format over network interface 111 for delivery to host server 140 and physical peripheral device 147A over link 150.

Dynamic server rebalancing system 130 can receive the client device-originated traffic over link 150. Since network link 150 couples to client device 110 and network link 151 couples to host device 140, interworking operations between the two port connections 133 is established. Dynamic server rebalancing system 130 provides interworking (208) between at least network link 150 and network link 151, or in some examples, between network link 150 and fabric link 152 if the peripheral device being accessed is among peripherals 153 rather than at host 140. Connection between a network link 150 and fabric link 152 can comprise protocol conversion where network frames or IP packets are stripped of various network protocol-specific headers and then payload data is re-packaged or encapsulated into frames or packets (or other fabric-native datagrams) suitable for transfer over fabric link 152. Interworking traffic between a same type of network links, such as links 150-151, may not require format conversions. Various reads, writes, input/output, control, commands, or other traffic can be handled this way to transfer transactions to peripheral device 147A at host device 140 which originate at client device 110. Likewise, the reverse operation can occur for transactions and responses originated by host device 140 and peripheral device 147A for transfer to client device 110.

Commands and other traffic transmitted to host 140 from client 110 may be received and processed at network interface 141. PoF system 145 communicates with the network stack of network interface 141 and interprets these received network frames or packets to convert into a native format suitable for local peripheral interconnect interface 142. Local peripheral interconnect interface 142 provides the communications in the native format to peripheral device 147A for execution or processing. Processing results may be intercepted or passed from peripheral interconnect interface 142 to PoF system 145, and then to network interface 141 for transmittal to client device 110 via network link 151 and dynamic server rebalancing system 130, similar to the transmission processed described for host device 110 above.

Once received into client system 110 over link 150 and network interface 111, these network frames or packets are processed by a network stack of network interface 111. PoF system 115 communicates with the network stack of network interface 111 and interprets these received network frames or packets to convert into a native format suitable for local peripheral interconnect interface 112, as though they came from emulated peripheral device 147B. Local peripheral interconnect interface 112 provides the communications in the native format to various software elements of client device 110, such as device drivers which interface with user-level applications. Client device 110 can thus use peripheral device 147A as if it were coupled locally to a local bus or connector of client device 110, via the emulated peripheral device 148B provided by PoF 115.

At 209, once peripheral device 147A is no longer needed by client device 110, PoF system 115 can operate to remove peripheral device 147B from client device 110, and send a disconnect indication to dynamic server rebalancing system 130 via link 150. In some examples, host device 140 may send an indication to dynamic server rebalancing system 130 indicating that peripheral device 147A is no longer available, e.g., based host device 140 requiring the peripheral or unavailability due to a shut down, force stop, or other operation. In such cases, the dynamic server rebalancing system 130 can send an indication to client device 110 to disconnect peripheral device 147B. PoF system 115 can effect removing instantiation of peripheral device 147B from local peripheral interconnect interface 112 by at least emulating a hardware device removal process or "hot unplug" operation to local peripheral interconnect interface 112. This hot unplug or detach process comprises triggering an exit point process, emulating to local peripheral interconnect interface 112, that a hardware device is no longer physically present in a slot or connector of client device 110. PoF system 115 calls an exit point process within local peripheral interconnect interface 112 without using any corresponding hardware interrupts or hardware indicators normally resultant from a physical unplugging or powering off of a peripheral device into client device 110. This can also include modification of local peripheral interconnect interface 112 to accept interrupts or detach commands from PoF system 115 instead of only from hardware changes. Any established address space descriptions for peripheral device 147B in host device 110 can be deconstructed or removed in local peripheral interconnect interface 112. In other example, a 'detach' command might be issued by PoF system 115 which indicates a PCIe vendor ID and PCIe device ID of peripheral device 147B to local peripheral interconnect interface 112.

At 210, dynamic server rebalancing system 130 may update data structure 136 to indicate peripheral device 147A is no longer assigned or attached to client system 110, and may return peripheral device 147A to an available peripheral device pool (or move it to an unassigned, unavailable pool, or re-assign it to host system 140, depending on the circumstances). The peripheral device 147A may be returned to the available pool based on an indication from client system 110 that the peripheral device 147B has been disconnected, or the dynamic server rebalancing system 130 may disassociate peripheral device 147A from client 110 without requiring confirmation from client 110.

As mentioned, once peripheral device 147A is removed, it can be returned to a pool of peripheral devices that remain in an inactive detached state until needed by a host device or other device. An attach process can then proceed as noted above. A further discussion of the pools of components or peripheral devices is discussed in FIG. 5. Moreover, instead of a GPU or similar device to peripheral device 147A, other fabric-coupled devices might be attached/detached as noted in the operations of FIG. 2, such as FPGAs, SSDs, NICs, memory devices, user interface devices, or other peripheral devices.

As noted above, while computing device 140 may be a host, and computing device 110 may be a client in regard to peripheral device 147A, the relationship may be reversed for other peripherals. For example, while computing device 110 is remotely accessing peripheral 147A, at the same time computing device 140 may be remotely accessing peripheral device 148A from computing device 110, via emulated peripheral device 148B of FIG. 1.

In some example embodiments, a computing device 110 may locally access its own peripheral devices 113 via peripheral interconnect interface 112, and may only access remote peripheral devices 143, 153 via link 150 and dynamic server rebalancing system 130. In these cases, only available or idle peripherals or resources may be reported to dynamic server rebalancing system 130, while peripherals 113 in use by the computing system itself may not be reported as available. However, in some examples, servers 110 capable of dynamic server rebalancing (e.g., via PoF system 115) may report all local peripherals 113 to dynamic server rebalancing system 130. In such embodiments, a computing system may not access its local peripherals directly, and may instead request usage of peripherals from the available pool of peripherals, via dynamic server rebalancing system 130, for all peripheral needs. In this manner, a computing system 110 may act as both host and client to itself, to "remotely" access its own local peripherals. Such an implementation may simplify resource rebalancing among computing devices 110, without conflicts over local resources between a host device and remote computing systems. For example, if a local peripheral device 148A of host 110 was idle and became attached to client system 140, and then host 110 developed a need for peripheral 148A, it could cause conflicts or interruption of operations at client system 140. By having all systems utilize the same shared pool of resources, this manner of conflict may be avoided.

Figure 3:
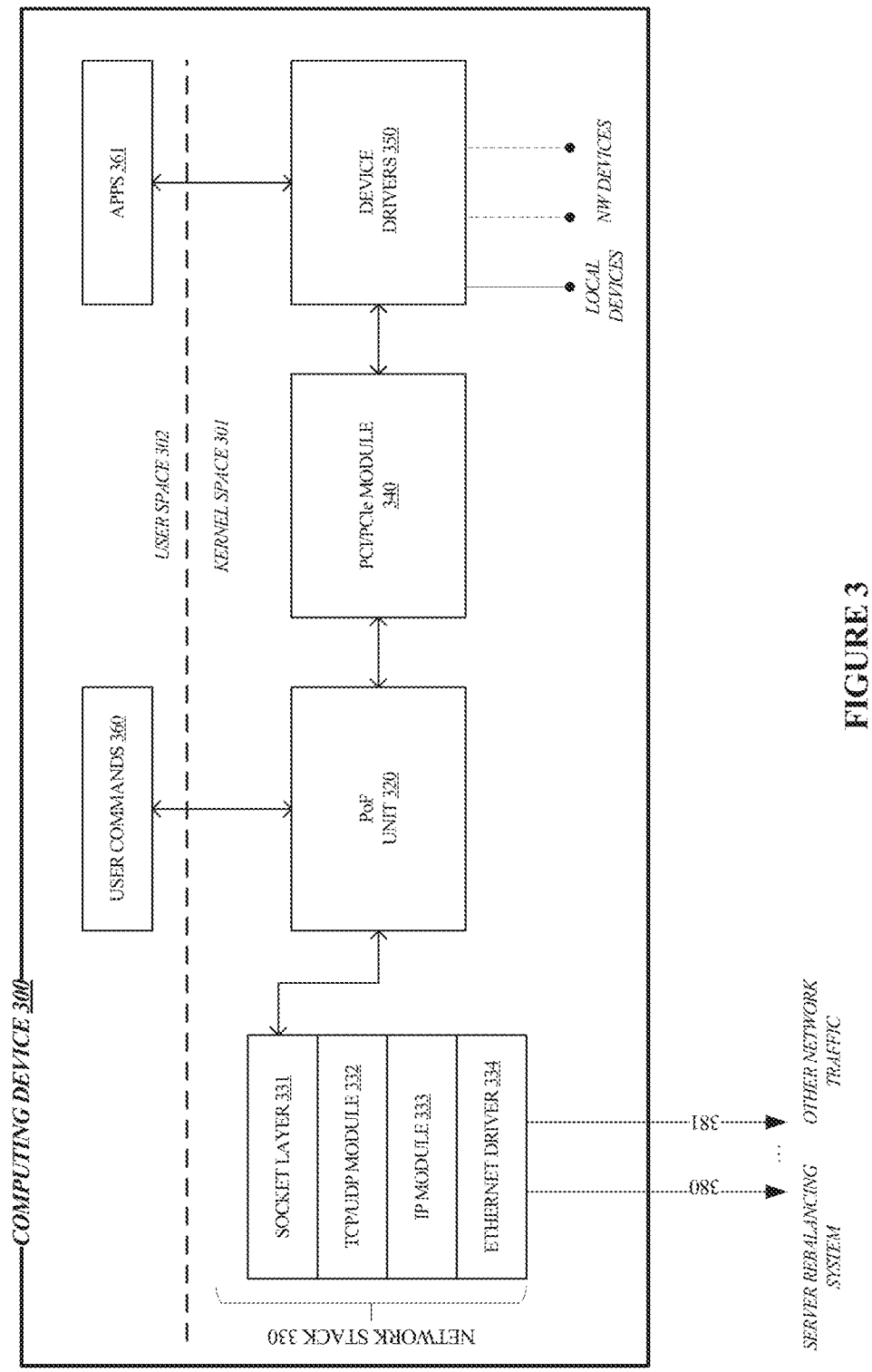
FIG. 3 is a diagram illustrating a host device in an implementation.

To discuss a more detailed structure and operation of a computing device 110, FIG. 3 is presented. Although the elements of FIG. 3 can be applied to computing device 110 of FIG. 1, it should be understood that computing device 110 can employ other structures and operations. FIG. 3 includes computing device 300 as an example of a computing device, server, computing system, blade server, or the like. Computing device 300 can include one or more network links, each having an associated network address. For example, a first network link 380 can couple computing device 300 to a dynamic server rebalancing system or network switch for coupling remote peripheral devices as discussed herein. Another network link 381 might communicate with other computing devices, further networks, or the Internet, among other various networks and endpoints, for transmissions unrelated to remote peripheral data traffic. The examples discussed regarding FIG. 3 also employ a TCP/IP style of networking for communication with computing device 300 and a PCIe fabric for communication with local and emulated or networked peripheral devices.

Computing device 300 includes a user space 302 and kernel space 301. Kernel space 301 may be a software system that comprises core operating system (OS) elements, such as the OS kernel, device drivers, hardware interfacing subsystems, network stacks, memory management subsystems, machine clock/time modules, and other low-level elements which are employed to act as an interface between the hardware components and user applications, as well as manage resources of computing device 300 among user-level and kernel-level software. User space 302 may include user applications, tools, games, graphical or command line user interfacing elements, and other similar elements. Typically, user space elements interface with device driver elements of kernel space 301 through an application programming interface (API) or other software-defined interface to share access to the low-level hardware elements among all user software, such as network controllers, graphics cards, audio devices, video devices, user interface hardware, and various communication interfaces. These device driver elements receive user-level traffic and interact with hardware elements that ultimately drive link layer communications, data transfer, data processing, logic, or other low-level functions.

Within kernel space 301, computing device 300 may include network stack 330, peripheral over fabric (PoF) unit 320, PCI/PCIe module 340, and device driver(s) 350, such as for connected peripheral devices. Other kernel-space elements are omitted for clarity and to focus on the kernel-level elements relevant to the operations herein. User space 302 includes user commands 360 and user applications 361. Network stack 330 comprises a TCP/IP stack and includes various layers or modules typical of network stacks, although some elements are omitted for clarity. Ethernet driver 334 includes features of the link layer, media access controller (MAC) addressing, Ethernet frame handling, and interfaces with a network interface controller (not shown) which then handles physical layer operations and structures. IP module 333 performs packet handling, IP addressing, and internetwork operations. TCP/UDP module 332 interfaces between data structures of user applications and IP module 333, as well as packetizes user data, handles error correction and re-transmission, acknowledgement of transfers, and the like. Socket layer 331 interfaces with user applications and other components of computing device 300, and acts as an endpoint for packetized communications. Individual sockets can be established, each of which handles a particular communication purpose, type, protocol, or other communication segregation. Several sockets can be established by a network stack 330, each of which can act as an endpoint for distinct communication types. For TCP/UDP, a socket is typically identified by an IP address and a port number, and a host device can have many such port numbers for a single IP address, as well as multiple IP addresses each with their own set of port numbers. Thus, many sockets might be established, each having a particular purpose. User-level applications, user processes, or even kernel-level processes, modules, and elements can interface with the network stack 330 through particular sockets.

In operation, responsive to attach/detach commands transferred by a server rebalancing/control entity (and directed to the socket noted above), PoF unit 320 can establish functionality of remote peripheral devices as though they were local peripherals of computing device 300, by calling hot plug/unplug functions of PCI/PCIe module 340 and emulating hardware behavior to these functions. PoF unit 320 interfaces with socket layer 331 to transfer and receive packets transporting traffic related to peripheral devices which can be located remotely from computing device 300. Instead of interfacing directly with socket layer 331, PoF unit 320 might instead use a TCP offload engine (TOE) stack and remote direct memory access (RDMA) for specific network interface controller vendor types. Socket layer 331, or equivalent noted above, can be identified by an IP address and port number and is typically dedicated to traffic related to a particular peripheral device or for all remote peripheral devices for computing device 300. A username/password or other security credentials can be passed along with the packets received by socket layer 331. PoF unit 320 has 'hooks' or software interface features to communicate with socket layer 331. Packets arrive from peripheral devices through network stack 330 and are interpreted by PoF unit 320, which then translates the communications to a format suitable for PCI/PCIe module 340. The packets received by interworking unit 320 can include the PCIe device state information of the peripheral device. PCI/PCIe module 340 receives these communications from PoF unit 320 as if they originated from a local peripheral device of computing device 300. Thus, PoF unit 320 emulates behavior of local peripheral devices to PCI/PCIe module 340, and such peripheral devices appear local to PCI/PCIe module 340. Device drivers, device tools or toolsets, and device-centric libraries function identically for locally connected PCIe devices or remote PCIe devices mapped through PoF unit 320. To achieve this emulation of a local device, PoF unit 320 can establish several functions or libraries which present targets for PCI/PCIe module 340 to communicate with for I/O transactions, configuration transactions, reads/writes, and other various communications.

Advantageously, user applications can interact with peripheral devices located remotely from computing device 300 using standard device drivers 350 which interface with PCI/PCIe module 340. Communications issued by PCI/PCIe module 340 normally intended for local hardware devices may be intercepted by PoF unit 320 and interpreted for transfer over network stack 330 and network link 380. When GPU peripheral devices are employed, in one example, graphics drivers can be employed without modification by user applications, such as machine learning, deep learning, artificial intelligence, or game applications, even though a GPU might be remotely located with regard to computing device 300.

To discuss a more detailed structure and operation of a dynamic server rebalancing system, FIG. 4 is presented. Although the elements of FIG. 4 can be applied to dynamic server rebalancing system 130 of FIG. 1, it should be understood that dynamic server rebalancing system 130 can employ other structures and operations. FIG. 4 includes dynamic server rebalancing system 400 as an example of a management node, computing device, server, computing system, blade server, or the like. The dynamic server rebalancing system 400 can establish and manage a communication fabric for the sharing of resources, such as peripheral devices, among connected computing nodes like computing device 110 and peripheral device pool 153 of FIG. 1. Dynamic server rebalancing system 400 can include one or more network links, each having an associated network address. For example, a first network link 480 can couple to a network switch and then to computing or server devices for coupling peripheral devices as discussed herein. The examples discussed regarding FIG. 4 also employ a TCP/IP style of networking for communication with dynamic server rebalancing system 400, and in some examples a PCIe interface for communication with pools of peripheral devices.

Dynamic server rebalancing system 400 may include a user space 402 and kernel space 401. Kernel space 401 may be a software system that comprises core operating system (OS) elements, such as the OS kernel, device drivers, hardware interfacing subsystems, network stacks, memory management subsystems, machine clock/time modules, and other low-level elements which are employed to act as an interface between the hardware components and user applications, as well as manage resources of dynamic server rebalancing system 400 among user-level and kernel-level software. User space 402 may include user applications, tools, telemetry, event handlers, user interfacing elements, and other similar elements. Typically, user space 402 elements interface with device driver elements of kernel space 401 through an application programming interface (API) or other software-defined interface to share access to the low-level hardware elements among all user software, such as network controllers, fabric interfaces, sideband communication/control interfaces, maintenance interfaces, user interface hardware, and various communication interfaces. These device driver elements receive user-level traffic and interact with hardware elements that ultimately drive link layer communications, data transfer, data processing, logic, or other low-level functions.

Within kernel space 401, dynamic server rebalancing system 400 may include network stack 430, fabric module 440, and PCI/PCIe interface 460. Other kernel-space elements are omitted for clarity and to focus on the kernel-level elements relevant to the operations herein. Network stack 430 comprises a TCP/IP stack and includes various layers or modules typical of network stacks, although some elements are omitted for clarity. Ethernet driver 434 includes features of the link layer, media access controller (MAC) addressing, Ethernet frame handling, and interfaces with a network interface controller (not shown) which then handles physical layer operations and structures. IP module 433 performs packet handling, IP addressing, and internetwork operations. TCP/UDP module 432 interfaces between data structures of user applications and IP module 433, as well as packetizes user data, handles error correction and re-transmission, acknowledgement of transfers, and the like. Socket layer 431 interfaces with user applications and other components of dynamic server rebalancing system 400, and acts as an endpoint for packetized communications. Individual sockets can be established, each of which handles a particular communication purpose, type, protocol, connected device, or other communication segregation. Several sockets can be established by a network stack, each of which can act as an endpoint for distinct communication types or communication links. For TCP/UDP, a socket is typically identified by an IP address and a port number, and a device can have many such port numbers for a single IP address, as well as multiple IP addresses each with their own set of port numbers. Thus, many sockets might be established, each having a particular purpose. User-level applications, user processes, or even kernel-level processes, modules, and elements can interface with the network stack through particular sockets.

Fabric module 440 can include drivers and other elements for managing the sharing or rebalancing of resources among computing devices connected to dynamic server rebalancing system 400. Fabric module 440 provides a pathway for command and control of the fabric itself, such as for logical partitioning/isolation or attaching/detaching of peripheral devices. Traffic related to reads, writes, configuration, and I/O of peripheral devices may also be handled by fabric module 440. In some example, fabric module 440 can include a PCI/PCIe subsystem which includes the equivalent of a protocol stack for PCI/PCIe links. Fabric module 440 can interface with physical layer elements, such as PCI/PCIe interface 460, and also presents a software/programming interface for configuration handler 412. Fabric module 440 can also interface user space elements (e.g., command processor 414) with PCI/PCIe interface 460. PCI/PCIe interface 460 may comprise a fabric chip or fabric switch circuitry which can provide one or more physical fabric links to couple to fabric module 440, to local devices of dynamic server rebalancing system 400, and to pools of peripheral devices coupled over associated PCIe links (e.g., peripheral devices 153 connected over links 152 of FIG. 1) or to further fabric chips or fabric switch circuitry that provide portions of the fabric and further fabric links.

User space 402 includes server rebalancing control element 410, which may further comprise monitor 411, configuration handler 412, event handler 413, command processor 414, and user interfaces 415. Command processor 414 can communicate with fabric module 440 to control the communication fabric(s) employed to establish logical partitioning or assignment among peripheral devices coupled to the fabric, to provide for routing of the communications/traffic to and from a selected peripheral device. Once the selected peripheral device is detached, the peripheral device can be placed into a pool of unused devices. User interfaces 415 can receive operator instructions to manage the fabric, or to control the addition or removal of peripheral devices to/from computing devices. User interfaces 415 can display or indicate lists of computing devices and peripherals along with associated statuses or telemetry thereof. User interfaces 415 can display or indicate which peripheral devices are associated with which computing devices. User interfaces 415 can display or indicate traffic histograms, logs, failures, alerts, and other various telemetry and status. User interfaces 415 can comprise terminal interfaces, application programming interfaces (APIs), representational state transfer (REST) interfaces, or RestAPIs, web interfaces, Web Socket interfaces, among other types of user interfaces including software, hardware, virtualized, or transported over various intermediary links. Event handler 413 can initiate attach/detach and device discovery operations with respect to computing devices. Configuration handler 412 interworks traffic between network-coupled computing devices, and optionally between collections of PCI/PCIe-connected peripheral devices from peripheral device pools. Configuration handler 412 interfaces with fabric module 440 for fabric communications and network stack 430 for network communications. Configuration handler 412 can interwork frame or packet formats, sizes, and types to transport communications over network links and PCI/PCIe links. Configuration handler 412 interfaces with network stack 430 through socket layer 431 through a particular socket indicated by at least an IP address and port number. Monitor 411 can monitor various telemetry, operation, logs, and status for dynamic server rebalancing system 400. Monitor 411 may maintain data structures indicating computing devices and associated sockets (IP addresses and ports), as well as indicators, addresses, or identities of peripheral devices. Monitor 414 can maintain logs and data structures within computer-readable media, such as data structures 435 and 436 in memory device 465 locally connected to PCI/PCIe interface 460 of dynamic server rebalancing system 400.

In operation, event handler 413 can initiate operations to discover compatible computing devices coupled over network interfaces and discover peripheral devices coupled to a communication fabric. Event handler 413 can instruct configuration handler 412 to discover computing devices through network stack 430. Socket information for compatible computing devices can be determined and stored for later use, for example in data structure 435. In some examples, event handler 413 can instruct command processor 414 to discover peripheral devices through fabric module 440 and PCI/PCIe interface 460. PCI/PCIe interface 460 scans the communication fabric to determine which peripheral devices and resources are available. Command processor 414 forms pools of free peripheral devices and indications of allocated peripheral devices, stores device/vendor ID of peripheral devices, and may store indications of PCIe addressing and buffer structures or characteristics of each peripheral device, for example in data structure 436.

Requests for adding peripheral devices to computing devices can be received, such as over user interfaces 415 or via network stack 430, and command processor 414 can segregate off or attach the selected peripheral device into a logical partitioning of the communication fabric via fabric module 440. This can trigger event handler 413 to initiate a notification to a host device at which a selected peripheral is physically located that the selected peripheral device has been assigned to a remote client computing device. The event handler 413 may also issue attach commands along with peripheral device information (e.g. vendor ID and device ID) to the client device, and this client device will then attach the peripheral device as described herein. From here, communications between the client device and the peripheral at the host device are interworked using configuration handler 412 interpreting and exchanging traffic between socket layer 431 via fabric module 440. In some examples, the event handler 413 may connect a requesting client device and a peripheral device unassociated with a host computing device, via fabric module 440 and PCI/PCIe interface 460. At some point, the attached peripheral devices might be desired to be removed or detached from a particular client device. Event handler 413 can detect these detach events, such as received by user interfaces 415 or from computing devices via network stack 430. Event handler 413 then issues detach commands through configuration handler 412 to detach the affected peripheral devices as discussed herein. Command processor 414 can remove the logical partitioning or assignment for the detached peripheral devices and return the detached peripheral devices to an inactive state or to the free pools of peripheral devices for later use.

FIG. 5 is a system diagram illustrating computing system 500. Computing system 500 can comprise elements of computing system 100 of FIG. 1, computing device 300 of FIG. 3, or dynamic server rebalancing system 400 of FIG. 4, although variations are possible. Computing system 500 comprises a rackmount arrangement of multiple modular chassis. One or more physical enclosures, such as the modular chassis, can further be included in shelving or rack units. Chassis 510, 520, 530, 540, and 550 are included in computing system 500, and may be mounted in a common rackmount arrangement or span multiple rackmount arrangements in one or more data centers. Within each chassis, modules or peripheral devices may be mounted to a shared circuit board and switch element, along with various power systems, structural supports, and connector elements. An enclosed modular system can include physical support structure and enclosure that includes circuitry, printed circuit boards, semiconductor systems, and structural elements. The modules that comprise the components of computing system 500 are insertable and removable from a rackmount style of enclosure. In some examples, the elements of FIG. 5 are included in a 'U' style chassis for mounting within the larger rackmount environment. It should be understood that the components of FIG. 5 can be included in any physical mounting environment, and need not include any associated enclosures or rackmount elements.

Chassis 510 may comprise a management module or top-of-rack (ToR) switch chassis, such as a dynamic server rebalancing system 130 of FIGS. 1 and 300 of 400 of FIG. 4, and may comprise management processor 511, Ethernet switch 516, and PCIe switch 560. Management processor 511 may comprise management operating system (OS) 512, user interface 513, and interworking unit 514. Management processor 511 may be coupled to Ethernet switch 516 over one or more network links via a network interface controller. Management processor 511 may be coupled to PCIe switch 560 over one or more PCIe links comprising one or more PCIe lanes.

Ethernet switch 516 may include network ports that provide switched network connections for attached devices, such as shown for network link 566. In an example embodiment, network link 566 may connect dynamic server rebalancing system chassis 510 to blade server motherboards 561-563 of chassis 520, 530, and 540. Ethernet switch 516 includes various network switching circuity to communicatively link individual ports to other ports based on traffic patterns, addressing, or other traffic properties. In one example, Ethernet switch 516 comprises an Ethernet or Wi-Fi (802.11xx) switch hosting wired or wireless connections, which can refer to any of the various network communication protocol standards and bandwidths available, such as 10BASE-T, 100BASE-TX, 1000BASE-T, 10GBASE-T (10GB Ethernet), 40GBASE-T (40GB Ethernet), gigabit (GbE), terabit (TbE), 200 GbE, 400 GbE, 800 GbE or other various wired and wireless formats and speeds. PCIe switch 560 may be coupled over one or more PCIe links to PCIe switch 564 in chassis 550. These one or more PCIe links are represented by PCIe intermodular connections 565.

Network links 566, PCIe links 565, and the components of dynamic server rebalancing system chassis 510 form a fabric that communicatively couples all of the various physical computing elements of FIG. 5. In some examples, management processor 511 might communicate over special management PCIe links or sideband signaling (not shown), such as inter-integrated circuit (I2C) interfaces, with elements of the fabric to control operations, partitioning, and attachment/detachment of components of the fabric. These control operations can include composing and decomposing peripheral devices, altering logical partitioning within the fabric, monitoring telemetry of the fabric, controlling power up/down operations of modules on the fabric, updating firmware of various circuitry that comprises the fabric, and other operations.

Chassis 520 530, and 540 may comprise blade server computing systems (such as computing system 110 of FIG. 1). Chassis 520 may comprise a blade server motherboard and Ethernet switch 561, with a variety of components and resources, including CPU 521, GPU 522, TPU 523, NIC 524, and SSD 525, although different numbers and arrangement of system components may be included. Similarly, chassis 530 may include a blade server motherboard 562 and locally connected components 531-535, and chassis 540 may include blade server motherboard 563 and locally connected components 541-545. Power systems, monitoring elements, internal/external ports, mounting/removal hardware, and other associated features can be included in each chassis. A component or module of example blade server 520 (e.g., PoF Unit 115 of FIG. 1 or 320 of FIG. 3) may generate a list of components 521-525 in chassis 520 available for remote sharing with other computing devices of system 500, and may provide a list of some or all of those components to a management device in chassis 510 via link 566. For example, the list may include all components 521-525 along with an indication of which are available for sharing and which are unavailable (e.g., due to being in use by blade server 520), or the list may only include devices that are available for sharing.

Chassis 550 may comprise a disaggregated collection of peripheral devices (such as peripheral devices 153 of FIG. 1). Chassis 550 may comprise a plurality of GPUs 551-555, each coupled to the PCIe fabric via backplane and PCIe switch 564 and associated PCIe links (not shown). In the example embodiment, chassis 550 may comprise a JBOG (just a box of GPUs) system, although other arrangements of disaggregated peripheral devices may also be provided. For example, chassis of CPUs, NICs, or SSDs may also be presented, or various combinations of types of disaggregated peripherals may be provided within a single chassis. For example, chassis 550 can include modular bays for mounting modules that comprise the corresponding elements of each CPU, GPU, SSD, NIC, or other module types. In addition to the types of components mentioned above, other component types such as FPGAs, CoPUs, RAM, memory devices, or other components can be similarly included. Power systems, monitoring elements, internal/external ports, mounting/removal hardware, and other associated features can be included in the chassis 550. A further discussion of the individual elements of chassis 520, 530, 540, and 550 is included below.

Once the various CPU, GPU, TPU, SSD, or NIC components of computing system 500 have been installed into the associated chassis or enclosures and reported or discovered by management device 510, the components can be logically assigned or organized into any number of separate and arbitrarily defined arrangements and attached to computing devices. These arrangements can be composed with selected quantities of CPUs, GPUs, SSDs, and NICs, including zero of any type of module. For an example computing device 540 shown in FIG. 5, a remote peripheral GPU 532 (which may be physically located at host computing device 530) has been attached. GPU 532 may be attached to client computing device 540 using logical partitioning or assignment within the network fabric, indicated by logical domain 570, over a network link 566. The logical arrangement of computing components, including locally-connected physical components and remotely- or logically-connected peripheral components, may be referred to as a "compute unit." The network fabric can be configured by management processor 511 to selectively route traffic among selected client devices and host devices, and the host device's locally attached peripheral devices, while maintaining logical isolation between components not included, physically or virtually, in the selected client device. In this way, a disaggregated and flexible "bare metal" configuration can be established among the components of computing system 500. The individual peripheral devices can be arranged according to particular user identities, computing device identities, execution jobs, or usage policies.

In some examples, management processor 511 may provide for attachment or detachment of peripheral devices and host devices via one or more user interfaces or job interfaces. For example, management processor 511 may provide user interface 513 which may present indications of available peripheral components to be attached, indications of available computing devices, as well as software and configuration information. In some examples, user interface 513 may provide templates for attaching predefined arrangements of peripheral devices to computing devices based on use cases or categories of usage. For example, the user interface 513 may provide suggested templates or configurations for game server units, artificial intelligence learning compute units, data analysis units, and storage server units. For example, a game server unit or artificial intelligence processing template may specify additional graphics processing resources when compared to a storage server unit template. Further, the user interface 513 may provide for customization of the templates or arrangement configurations and options for users to create arrangement templates from component types selected arbitrarily from lists or categories of components.

In additional examples, management processor 511 may provide for policy based dynamic adjustments to arrangements during operation. In some examples, user interface 513 can allow the user to define policies for adjustments of the peripheral devices allocated to computing devices as well as adjustments to the configuration information thereof during operation. In an example, during operation, management processor 511 may analyze telemetry data to determine the utilization of the current resources by the computing devices. Based on the current utilization, a dynamic adjustment policy may specify that general processing resources, graphics processing resources, storage resources, networking resources, memory resources, and so on, be allocated to a host device or removed from a host device. For example, the telemetry data may show that the current usage level of the allocated storage resources of a computing device is approaching a threshold level and allocate an additional storage device to the computing device.

Management processor 511 may provide for control and management of multiple protocol communication fabrics, including combining different communication protocols such as PCIe and Ethernet. For example, management processor 511 and the devices connected via links 566 and 565 may provide for communicative coupling of physical components using multiple different implementations or versions of Ethernet, PCIe, and similar protocols. Further, next-generation interfaces can be employed, such as Gen-Z, CCIX, CXL, OpenCAPI, or wireless interfaces including Wi-Fi interfaces or cellular wireless interfaces. Also, although Ethernet and PCIe are used in FIG. 5, it should be understood that different or additional communication links or busses can instead be employed, such as NVMe, SAS, FibreChannel, Thunderbolt, SATA Express, among other interconnect, network, and link interfaces.

Turning now to a discussion on the components of computing system 500, management processor 511 can comprise one or more microprocessors and other processing circuitry that retrieves and executes software from an associated storage system, for management of operating system 512, user interface 513, interworking unit 514, or components or modules, or any combination thereof. Management processor 511 can be implemented within a single processing device but can also be distributed across multiple processing devices or sub-systems that cooperate in executing program instructions. Examples of management processor 511 include general purpose central processing units, application specific processors, and logic devices, as well as any other type of processing device, combinations, or variations thereof. In some examples, management processor 511 comprises an Intel® or AMD® microprocessor, Apple® microprocessor, ARM® microprocessor, field-programmable gate array (FPGA), application specific integrated circuit (ASIC), application specific processor, or other microprocessor or processing elements.

Management operating system (OS) 512 is executed by management processor 511 and provides for management of resources of computing system 500 and for execution of user interface 513 and interworking unit 514. Management OS 512 provides for the functionality and operations described herein for management processor 511, specifically, for user interface 513 and interworking unit 514.

User interface 513 can present graphical user interfaces (GUIs), Application Programming Interfaces (APIs), representational state transfer (REST) interfaces, RestAPIs, command line interfaces (CLIs), Web Socket interfaces, or other interfaces, to one or more users. User interface 513 can be employed by end users or administrators to configure computing devices and peripheral devices, establish arrangements of computing devices and peripheral devices, receive status, telemetry, and other notifications regarding operation of computing devices and peripheral devices, and perform other operations. User interface 513 can be employed to manage, select, and alter templates. User interface 513 can be employed to manage, select, and alter policies. User interface 513 also can provide telemetry information for the operation of computing system 500 to users, such as in one or more status interfaces or status views. The state of various components or elements of computing system 500 can be monitored through user interface 513, such as CPU states, GPU states, NIC states, SSD states, Ethernet states, PCIe switch/fabric states, among others. Various performance metrics, error statuses can be monitored using user interface 513.

Interworking unit 514 provides for various fabric interworking features and operations discussed herein, along with discovery, attachment, and de-attachment of peripheral devices with regard to computing devices. Specifically, interworking unit 514 may discover computing and peripheral devices within computing system 500 coupled over a communication links (e.g., 565-566), receive indications of available peripheral devices located at computing devices, and catalogs these devices within one or more data structures 590. The data structures 590 are illustrated by example server devices data structure 591 and peripheral devices data structure 592. The cataloging can include noting device identifiers, vendor identifiers, addresses, ports, sockets, assignments or attachments between devices, or other properties. Interworking unit 514 can receive operator instructions via user interface 513 of from computing devices to establish arrangements between computing devices and one or more peripheral devices (e.g., attaching a peripheral from a host device to be emulated at a client device). The instructions can identify which computing devices and which peripheral devices or which type of peripheral devices are to be coupled. Responsive to the instructions, interworking unit 514 initiates attachment of one or more peripheral devices from an available device pool into client computing devices, such as by issuing one or more attach commands to PoF units of the client devices. This attach instruction alerts the PoF units of the client devices to initiate instantiation of the peripheral devices into local peripheral interconnect interfaces of the client devices by at least emulating behavior of the peripheral devices coupled over network interfaces as local peripheral devices coupled to the peripheral interconnect interfaces of the client systems. The interworking unit 514 may also notify a host device for the linked peripheral devices that the peripheral devices have been assigned or attached to a client device. Interworking unit 514 can then interwork traffic between client and host systems along network link 566, and in some examples, between network link 566 and PCIe link 565. Interworking unit 514 can receive instructions to detach peripheral devices from client devices, and issue detach commands to PoF units of the client devices. Once detached, the peripheral devices can be placed back into a pool of free devices for later usage by other computing devices.

One example attachment operation is shown in FIG. 5. An instruction can be received to attach GPU 532 (physically located at computing device 530) to computing device 540, and interworking unit 514 can provide an attach command and identifiers of GPU 532 to computing device 540 over a corresponding network link 566. Once attached, computing device 540 may become the client device for GPU 532, and computing device 530 may be the host device. Table 591 shows a target computing device identifier of 001236 (corresponding to client device 540) having an IP address of 10.10.10.3 and (not shown) corresponding socket corresponding to a port number. Table 592 shows GPU 532 having a vendor ID and device ID which are provided to the target client device 540 for attachment. A logical isolation for GPU 532 can be established between GPU 532 and management processor 511 in the communication fabric to allow for communications of the target client device 540 to be properly exchanged with GPU 532 over the communication fabric without interference with other peripheral devices and computing devices. This arrangement can be referred to as logical domain 570 which includes elements of the communication links (e.g., Ethernet links 566) between the host 530, client 540, and fabric switch circuitry 510, the fabric switch circuitry itself, and GPU 532. Communications can be directed over network links 566 from the client device 540 to the GPU 532 at host 530 using the socket corresponding to host device 530, namely the IP address of 10.10.10.2 and associated port number, using the device ID and vendor ID of GPU 532, as intercepted and interpreted by interworking unit 514. Communications of GPU 532 to client device 540 can be directed over a network link 566 using the IP address of the client device 540, namely 10.10.10.3, as intercepted and interpreted by interworking unit 514.

More than one instance of elements 511-514 (e.g., more than one dynamic server rebalancing system) can be included in computing system 500. User commands, such as those received over a GUI, can be received into any of the management instances and forwarded by the receiving management instance to the handling management instance. Each management instance can have a unique or pre-assigned identifier which can aid in delivery of user commands to the proper management instance. Additionally, management processors of each management instance can communicate with each other, such as using a mailbox process or other data exchange technique. This communication can occur over dedicated sideband interfaces, such as I2C interfaces, or can occur over PCIe or Ethernet interfaces that couple each management processor.

A plurality of CPUs 521, 531, 541 are included in system 500. Each CPU may comprise a CPU module that includes one or more CPUs or microprocessors and other processing circuitry that retrieves and executes software, such as operating systems, device drivers, and applications, from an associated storage system. Each CPU can be implemented within a single processing device but can also be distributed across multiple processing devices or sub-systems that cooperate in executing program instructions. Examples of each CPU include general purpose central processing units, application specific processors, and logic devices, as well as any other type of processing device, combinations, or variations thereof. In some examples, each CPU comprises an Intel® microprocessor, Apple® microprocessor, AMD® microprocessor, ARM® microprocessor, graphics processor, compute cores, graphics cores, ASIC, FPGA, or other microprocessor or processing elements. Each CPU can also communicate with other CPUs, such as those in a same storage assembly/enclosure or another storage assembly/enclosure over one or more PCIe interfaces and PCIe fabrics.

A plurality of GPUs 522, 532, 542, 551-555 and TPUs 523, 533, 543 are included in system 500, which may represent any type of CoCPU. Each GPU may comprise a GPU module that includes one or more GPUs. Each GPU includes graphics processing resources that can be allocated to one or more host devices. The GPUs can comprise graphics processors, shaders, pixel render elements, frame buffers, texture mappers, graphics cores, graphics pipelines, graphics memory, or other graphics processing and handling elements. In some examples, each GPU comprises a graphics 'card' comprising circuitry that supports a GPU chip. Example GPU cards include nVIDIA® or AMD® graphics cards that include graphics processing elements along with various support circuitry, connectors, and other elements. Similarly, each tensor processing unit (TPU) may comprise a TPU module including one or more TPUs. Each TPU may include circuitry and resources for AI acceleration and processing, configured for neural network machine learning applications. In further examples, other styles of graphics processing units, graphics processing assemblies, or co-processing elements can be employed, such as machine learning processing units, AI accelerators, FPGAs, ASICs, or other specialized processors that may include specialized processing elements to focus processing and memory resources on processing of specialized sets of data.

A plurality of NICs 524, 534, 544 are included in system 500, each having an associated MAC address or Ethernet address. Each NIC may comprise a NIC module that includes one or more NIC. Each NIC may include network interface controller cards for communicating over TCP/IP (Transmission Control Protocol (TCP)/Internet Protocol) networks or for carrying user traffic, such as iSCSI (Internet Small Computer System Interface) or NVMe (NVM Express) traffic for elements of an associated host device. NICs can comprise Ethernet interface equipment, and can communicate over wired, optical, or wireless links. External access to components of computing system 500 can be provided over packet network links provided by the NICs. NICs might communicate with other components of an associated host device over associated PCIe links of the PCIe fabric. In some examples, NICs are provided for communicating over Ethernet links with management processor 511. In additional examples, NICs are provided for communicating over Ethernet links with one or more other chassis, rackmount systems, data centers, computing platforms, communication fabrics, or other elements.

A plurality of SSDs 525, 535, 545 are included in system 500. Each SSD may comprise an SSD module that includes one or more SSD. Each SSD includes one or more storage drives, such as solid-state storage drives with a PCIe interface. Each SSD also includes PCIe interfaces, control processors, and power system elements. Each SSD may include a processor or control system for traffic statistics and status monitoring, among other operations. In yet other examples, each SSD instead comprises different data storage media, such as magnetic hard disk drives (HDDs), crosspoint memory (e.g. Optane® devices), static random-access memory (SRAM) devices, programmable read-only memory (PROM) devices, or other magnetic, optical, or semiconductor-based storage media, along with associated enclosures, control systems, power systems, and interface circuitry.

Other specialized devices might be employed in computing platform in addition to CPUs, GPUs, TPUs, SSDs, and NICs. These other specialized devices can include co-processing modules comprising specialized co-processing circuitry, fabric-coupled RAM devices, ASIC circuitry, or FPGA circuitry, as well as various memory components, storage components, and interfacing components, among other circuitry. The other specialized devices can each include a PCIe interface or Ethernet interface by which they may be incorporated into the network fabric of system 500, either directly or by attaching to a computing device for remote access. These other specialized devices might comprise PCIe endpoint devices or other computing devices which may or may not have a root complex.

FPGA devices can be employed as one example of the other specialized devices. FPGA devices can receive processing tasks from another peripheral device, such as a CPU or GPU, to offload those processing tasks into the FPGA programmable logic circuitry. An FPGA is typically initialized into a programmed state using configuration data, and this programmed state includes various logic arrangements, memory circuitry, registers, processing cores, specialized circuitry, and other features which provide for specialized or application-specific circuitry. FPGA devices can be re-programmed to change the circuitry implemented therein, as well as to perform a different set of processing tasks at different points in time. FPGA devices can be employed to perform machine learning tasks, implement artificial neural network circuitry, implement custom interfacing or glue logic, perform encryption/decryption tasks, perform block chain calculations and processing tasks, or other tasks. In some examples, a CPU will provide data to be processed, locally or remotely, by the FPGA over a PCIe interface to the FPGA. The FPGA can process this data to produce a result and provide this result over the PCIe interface to the CPU. More than one CPU and/or FPGA might be involved to parallelize tasks over more than one device or to serially process data through more than one device. In some examples, an FPGA arrangement can include locally-stored configuration data which may be supplemented, replaced, or overridden using configuration data stored in the configuration data storage. This configuration data can comprise firmware, programmable logic programs, bitstreams, or objects, PCIe device initial configuration data, among other configuration data discussed herein. FPGA arrangements can also include SRAM devices or PROM devices used to perform boot programming, power-on configuration, or other functions to establish an initial configuration for the FPGA device. In some examples, the SRAM or PROM devices can be incorporated into FPGA circuitry or packaging.

Blade server motherboards 561-563 may include a printed circuit board or backplane onto which computer components can be attached or connected. For example, peripheral devices 521-525, 531-535, and 541-545 may connected to PCIe ports or other slots of blade server motherboards 561-563. Blade server motherboards 561-563 may each include one or more network switches or ports (not shown) to connect to network link 566, such as Ethernet switches. Blade server motherboards 561-563 can communicate with other components of system 500 over network link 566, and thereby access remote peripheral devices, and enable external devices to access and utilize the resources of local peripheral devices, such as devices 521-525 for chassis 520, devices 531-535 for chassis 530, and devices 541-545 for chassis 540. Blade server motherboards 561-563 can logically interconnect the devices of system 500, as managed by management processor 511. Attach or detach commands for remote peripherals can be sent or received through blade server motherboards 561-563 via network link 566, and blade server motherboards 561-563 can receive listings of available resources from management processor 511 or issue requests to access remote resources to management processor 511.

PCIe switch 564 can communicate with other components of system 500 over associated PCIe link 565. In the example in FIG. 5, PCIe switch 564 can be used for carrying traffic between PCIe devices within chassis 564 and the switching unit in chassis 510, from which the traffic can be directed to other chassis over network link 566. PCIe switch 564 may comprise a PCIe cross connect switch for establishing switched connections between any PCIe interfaces handled by PCIe switches in system 500. The PCIe switches discussed herein can logically interconnect various ones of the associated PCIe links based at least on the traffic carried by each PCIe link. In these examples, a domain-based PCIe signaling distribution can be included which allows segregation of PCIe ports of a PCIe switch according to user-defined groups. The user-defined groups can be managed by management processor 511 which logically integrates components into associated logical units and logically isolates components and logical units from among each other. In addition to, or alternatively from the domain-based segregation, each PCIe switch port can be a non-transparent (NT) or transparent port. An NT port can allow some logical isolation between endpoints, much like a bridge, while a transparent port does not allow logical isolation, and has the effect of connecting endpoints in a purely switched configuration. Access over an NT port or ports can include additional handshaking between the PCIe switch and the initiating endpoint to select a particular NT port or to allow visibility through the NT port.

In further examples, memory mapped direct memory access (DMA) conduits can be formed between individual CPU/PCIe device pairs. This memory mapping can occur over the PCIe fabric address space, among other configurations. To provide these DMA conduits over a shared PCIe fabric comprising many CPUs and GPUs, the logical partitioning described herein can be employed. Specifically, NT ports or domain-based partitioning on PCIe switches can isolate individual DMA conduits among the associated CPUs/GPUs. The PCIe fabric may have a 64-bit address space, which allows an addressable space of 264 bytes, leading to at least 16 exbibytes of byte-addressable memory. The 64-bit PCIe address space can be shared by all compute units or segregated among various compute units forming arrangements for appropriate memory mapping to resources.

PCIe interfaces can support multiple bus widths, such as x1, x2, x4, x8, x16, and x32, with each multiple of bus width comprising an additional "lane" for data transfer. PCIe also supports transfer of sideband signaling, such as System Management Bus (SMBus) interfaces and Joint Test Action Group (JTAG) interfaces, as well as associated clocks, power, and bootstrapping, among other signaling. PCIe also might have different implementations or versions employed herein. For example, PCIe version 3.0 or later (e.g. 4.0, 5.0, or later) might be employed. Moreover, next-generation interfaces can be employed, such as Gen-Z, Cache Coherent CCIX, CXL, or OpenCAPI. Also, although PCIe is used in FIG. 5, it should be understood that different communication links or busses can instead be employed, such as NVMe, Ethernet, SAS, FibreChannel, Thunderbolt, SATA Express, among other interconnect, network, and link interfaces. NVMe is an interface standard for mass storage devices, such as hard disk drives and solid-state memory devices. NVMe can supplant SATA interfaces for interfacing with mass storage devices in personal computers and server environments. However, these NVMe interfaces are limited to one-to-one host-drive relationship, similar to SATA devices. In the examples discussed herein, a PCIe interface can be employed to transport NVMe traffic and present a multi-drive system comprising many storage drives as one or more NVMe virtual logical unit numbers (VLUNs) over a PCIe interface.

Any of the links in FIG. 5 can each use various communication media, such as air, space, metal, optical fiber, or some other signal propagation path, including combinations thereof. Any of the PCIe links in FIG. 5 can include any number of composite PCIe links or single/multi-lane configurations. Any of the links in FIG. 5 can each be a direct link or might include various equipment, intermediate components, systems, and networks. Any of the links in FIG. 5 can each be a common link, shared link, aggregated link, or may be comprised of discrete, separate links.

The discussion now turns to brief examples of compute unit formation and attachment of peripheral components from host device to remote client devices. In FIG. 5, configurable logical visibility can be provided to computing devices to any/all available peripheral devices or resources coupled to the network fabric of computing system 500, as listed in data structure 592. Computing devices may request access to available resources, and may logically attach remote peripherals as though they were local resources. Components that have been logically linked may form a compute unit. For example, CPU 521, GPU 522, and SSD 525 of chassis 520 may request and be granted access to remote GPU 532 from chassis 530, NIC 544 from chassis 540, and GPU 551 from chassis 550, forming one compute unit. Thus in some examples, 'm' number of SSDs or GPUs can be coupled with 'n' number of CPUs to allow for a large, scalable architecture with a high-level of performance, redundancy, and density. This partitioning can ensure that GPUs can be interworked with a desired CPU or CPUs and that more than one GPU, such as eight (8) GPUs, can be associated with a particular compute unit. The management processor 511 may be configured to update one or more data structures maintained by the management processor 511 as resources or peripheral devices are attached or detached from various computing devices or compute units.

FIG. 6 is a block diagram illustrating an implementation of management processor 600. Management processor 600 illustrates an example of any of the control elements, control systems, interworking units, dynamic server rebalancing systems, PoF units, fabric control elements, or management processors discussed herein, such as PoF system 115 of FIG. 1, dynamic server rebalancing system 130 of FIG. 1, PoF unit 320 of FIG. 3, server rebalancing control element 410 of FIG. 4, or management processor 511 of FIG. 5. Management processor 600 includes communication interfaces 601, user interface 603, and processing system 610. Processing system 610 includes processing circuitry 611 and data storage system 612 which can include random access memory (RAM) 613, although additional or different configurations of elements can be included.

Processing system 610 is generally intended to represent a computing system with which at least software 620 is deployed and executed in order to render or otherwise implement the operations described herein. However, processing system 610 can also represent any computing system on which at least software 620 and data 630 can be staged and from where software 620 and data 630 can be distributed, transported, downloaded, or otherwise provided to another computing system for deployment and execution, or for additional distribution. Processing circuitry 611 can be implemented within a single processing device but can also be distributed across multiple processing devices or subsystems that cooperate in executing program instructions. Examples of processing circuitry 611 include general purpose central processing units, microprocessors, application specific processors, and logic devices, as well as any other type of processing device. In some examples, processing circuitry 611 includes physically distributed processing devices, such as cloud computing systems.

Communication interfaces 601 include one or more communication fabric and/or network interfaces for communicating over Ethernet links, PCIe links, and networks such as packet networks, the Internet, and the like. The communication interfaces 601 can include Ethernet interfaces, PCIe interfaces, serial interfaces, serial peripheral interface (SPI) links, inter-integrated circuit (I2C) interfaces, universal serial bus (USB) interfaces, UART interfaces, wireless interfaces, or one or more local or wide area network communication interfaces which can communicate over Ethernet or Internet protocol (IP) links. Communication interfaces 601 can include network interfaces configured to communicate using one or more network addresses, which can be associated with different network links. Examples of communication interfaces 601 include network interface controller equipment, transceivers, modems, and other communication circuitry. Communication interfaces 601 can communicate with control elements of a network or other communication fabric to establish logical partitioning or remote resource assignment within the fabric, such as over an administrative or control interface of one or more communication switches of the communication fabric. Communication interfaces 601 can communicate over a PCIe fabric to exchange traffic/communications with peripheral devices.

User interface 603 may include a software-based interfaces or hardware-based interfaces. Hardware-based interfaces include touchscreen, keyboard, mouse, voice input device, audio input device, or other touch input device for receiving input from a user. Output devices such as a display, speakers, web interfaces, terminal interfaces, and other types of output devices may also be included in user interface 603. User interface 603 can provide output and receive input over a network interface, such as communication interfaces 601. In network examples, user interface 603 might packetize display or graphics data for remote display by a display system or computing system coupled over one or more network interfaces. Physical or logical elements of user interface 603 can provide alerts or visual outputs to users or other operators. User interface 603 may also include associated user interface software executable by processing system 610 in support of the various user input and output devices discussed above. Separately or in conjunction with each other and other hardware and software elements, the user interface software and user interface devices may support a graphical user interface, a natural user interface, or any other type of user interface.

User interface 603 can present command line interfaces (CLIs), application programming interfaces (APIs), graphical user interfaces (GUIs), representational state transfer (REST) interfaces, RestAPIs, Web Socket interfaces, or other interfaces to one or more users. The user interfaces can be employed by operators or administrators to assign assets (compute units/resources/peripherals) to each host device. In some examples, the user interfaces provide an interface to allow an end user to determine one or more templates and dynamic adjustment policy sets to use or customize for use in creation of compute units. User interface 603 can be employed to manage, select, and alter machine templates or alter policies. User interface 603 also can provide telemetry information, such as in one or more status interfaces or status views. The state of various components or elements can be monitored through user interface 603, such as processor state, network state, storage unit state, PCIe element state, among others. Various performance metrics, error statuses can be monitored using user interface 603.

Storage system 612 and RAM 613 together can comprise a memory device or non-transitory data storage system, although variations are possible. Storage system 612 and RAM 613 can each comprise any storage media readable by processing circuitry 611 and capable of storing software and OS images. RAM 613 can include volatile and nonvolatile, removable and non-removable media implemented in any method or technology for storage of information, such as computer readable instructions, data structures, program modules, or other data. Storage system 612 can include non-volatile storage media, such as solid-state storage media, flash memory, NAND flash or NOR flash, phase change memory, magnetic memory, or other non-transitory storage media, including combinations thereof. Storage system 612 and RAM 613 can each be implemented as a single storage device but can also be implemented across multiple storage devices or sub-systems. Storage system 612 and RAM 613 can each comprise additional elements, such as controllers, capable of communicating with processing circuitry 611.

Software 620 or data 630 can be stored on or in storage system 612 or RAM 613, and can comprise computer program instructions, firmware, data structures, or some other form of machine-readable processing instructions having processes that, when executed by a processing system, direct processor 600 to operate as described herein. Software 620 can reside in RAM 613 during execution and operation of processor 600, and can reside in non-volatile portions of storage system 612 during a powered-off state, among other locations and states. Software 620 can be loaded into RAM 613 during a startup or boot procedure as described for computer operating systems and applications. Software 620 can receive user input through user interface 603. This user input can include user commands as well as other input, including combinations thereof.

Software 620 includes applications 621 and operating system (OS) 622. Software 620 can drive processor 600 to receive user or computing device commands to attach or detach peripheral devices to/from computing devices. Software 620 can drive processor 600 to receive and monitor telemetry data, statistical information, operational data, and other data to provide telemetry to users and alter operation according to the telemetry data, policies, or other data and criteria. Software 620 can drive processor 600 to manage peripheral device resources and computing device resources, establish domain partitioning or NT partitioning among communication fabric elements, and interface with individual communication switches to control operation of such communication switches, among other operations. The software 620 can also include user software applications, application programming interfaces (APIs), or user interfaces. The software 620 can be implemented as a single application or as multiple applications. In general, the software 620 can, when loaded into a processing system 610 and executed, transform the processing system 610 from a general-purpose device into a special-purpose device customized as described herein.

Software applications 621 might take different forms depending upon the operations and devices implemented by management processor 600, and may include a set of applications 640 or 650. For example, when management processor 600 operates a dynamic server rebalancing system, then application set 640 can be deployed comprising discovery application 641, event application 642, fabric interworking application 643, and fabric user interface application 644. Alternatively, when management processor 600 operates a computing device such as a blade server, then application set 650 can be deployed comprising server interworking application 651 and server user interface application 652. Software applications 641-644 and 651-652 may each comprise executable instructions which can be executed by processor 600 for operating a computing system or processing circuitry according to the operations discussed herein.

Application set 640 includes discovery application 641, event application 642, fabric interworking application 643, and fabric user interface application 644. Discovery application 641 may obtain an indication of computing devices and associated local peripheral devices, or disaggregated peripheral devices, available for remotely associating with client computing devices. The indications of the computing devices or peripheral devices may comprise addressing information, device identifiers, vendor identifiers, device specifications or requirements, associations between devices, or other information. Discovery application 641 may obtain the indications of computing devices and peripherals over a network interface, via a PCIe interface, or via other connection links between devices. Discovery application 641 can store these indications within data 630. Based on the indications, event application 642 initiates instantiation and de-instantiation of a peripheral device from a host device, or a disaggregated peripheral device, into a local peripheral interconnect interface of a client device. Fabric interworking application 643 intercepts client-originated traffic for a remote peripheral device received over a network interface, interprets the client-originated traffic to perform any format conversions necessary to deliver the traffic to the target peripheral, and routes the client-originated traffic in the appropriate format over a network or PCIe interface for delivery to the peripheral device. Similarly, fabric interworking application 643 intercepts peripheral-originated traffic, from either a host device or disaggregated peripheral device, directed to a client device, interprets the peripheral-originated traffic to perform any required format conversions to transfer the traffic to the client device, and routes the peripheral-originated traffic in the appropriate format over a network interface for delivery to the client device. Fabric user interface application 644 can receive operator instructions to attach or detach peripheral devices with respect to computing devices, and can present various information, status, telemetry, logs, and the like to operations over various types of user interfaces. Commands or requests to attach or detach peripheral devices received from networked computing systems may be received via event application 642, fabric interworking application 643, or fabric user interface application 644, depending on implementation.

Application set 650 includes server interworking application 651 server host user interface application 652. Server interworking application 561 may interface with a network stack of the computing device to interwork traffic of the peripheral devices with the local peripheral interconnect interface. Server interworking application 561 can emulate behavior of peripheral devices coupled over a network interface as a local peripheral device coupled to a peripheral interconnect interface of a client system. Server interworking application 561 emulates the hardware plugging process by at least providing address space descriptions to the local peripheral interconnect interface to access the peripheral device as a local peripheral device coupled to the client system. Server interworking application 561 removes instantiation of the peripheral devices from the local peripheral interconnect interface by at least emulating a hardware removal process in the local peripheral interconnect interface.

Once instantiated into the local peripheral interconnect interface of the client device, a device driver of the client device can interface with the peripheral device through the local peripheral interconnect interface. Server interworking application 561 emulates the behavior of peripheral devices by at least intercepting client originated traffic for the peripheral device from the local peripheral interconnect interface, interpreting the client originated traffic to convert from a native peripheral format (such as PCIe frames or memory-mapped formats) into a network format (e.g. frames or packets with associated encapsulation and addressing/headers/footers) suitable for transfer over the network interface, and routing the client originated traffic in the packet format over the network interface for delivery to the peripheral devices. Server interworking application 561 emulates the behavior of the peripheral devices by at least receiving peripheral device originated traffic in a packet format from the network interface, and interpreting the peripheral device originated traffic in the packet format to convert to a native peripheral format suitable for the local peripheral interconnect interface. Server interworking application 561 initiates instantiation of the peripheral device into a local peripheral interconnect interface by at least triggering an entry point process in the local peripheral interconnect interface to emulate a hardware plugging process for the peripheral device with the local peripheral interconnect interface. For a host server device, server interworking application 651 can route traffic from a remote client device to a local peripheral device connected to the local peripheral interconnect interface. For example, client originated traffic may be received by the server interworking application 651 of the host over a network connection, and converted into a format for use by the host peripheral interconnect interface, such as PCIe frames. The client originated traffic can thereby be routed from the server interworking application 651 to the peripheral interconnect interface, and from there to the local peripheral device for processing. In some examples, server interworking application 651 may notify the host sever system that a local peripheral assigned to a remote client is unavailable for use by and OS or software local to that host, outside of executing commands received from a remote client device, and may send indications, commands, or requests over a network indicating the availability status of local peripherals, requesting that a local peripheral be detached from a remote client, or requesting access to a remote peripheral from an available peripherals pool.

Server user interface application 652 can provide local indications of attachments and de-attachments of peripheral devices to operators of computing devices, and can receive operator instructions to attach or detach peripheral devices, among other operations.

In addition to software 620, other data 630 comprising various data structures can be stored by storage system 612 and RAM 613. Data 630 can comprise templates, policies, telemetry data, event logs, or fabric status. Data 630 can include indications and identities of peripheral devices and computing devices. Data 630 can include present assignments of peripheral devices to client devices. Fabric status includes information and properties of the various communication fabrics that comprise a pool of resources or pool of components, such as fabric type, protocol version, technology descriptors, header requirements, addressing information, and other data. Fabric data might include relations between components and the specific fabrics through which the components connect.

Discussed herein are various peripheral devices including data processing elements or other computing components coupled over one or more communication fabrics or communication networks. Various communication fabric types or communication network types might be employed herein. For example, a Peripheral Component Interconnect Express (PCIe) fabric can be employed to couple to CoPUs, which might comprise various versions, such as 3.0, 4.0, or 5.0, among others. Instead of a PCIe fabric, other point-to-point communication fabrics or communication buses with associated physical layers, electrical signaling, protocols, and layered communication stacks can be employed. These might include Gen-Z, Ethernet, InfiniBand, NVMe, Internet Protocol (IP), Serial Attached SCSI (SAS), FibreChannel, Thunderbolt, Serial Attached ATA Express (SATA Express), NVLink, Cache Coherent Interconnect for Accelerators (CCIX), Compute Express Link (CXL), Open Coherent Accelerator Processor Interface (OpenCAPI), Wi-Fi (802.11x), or cellular wireless technologies, among others. Communication networks can couple to host systems and include Ethernet or Wi-Fi (802.11x), which can refer to any of the various network communication protocol standards and bandwidths available, such as 10BASE-T, 100BASE-TX, 1000BASE-T, 10GBASE-T (10GB Ethernet), 40GBASE-T (40GB Ethernet), gigabit (GbE), terabit (TbE), 200 GbE, 400 GbE, 800 GbE, or other various wired and wireless Ethernet formats and speeds. Cellular wireless technologies might include various wireless protocols and networks built around the 3rd Generation Partnership Project (3GPP) standards including 4G Long-Term Evolution (LTE), 5G NR (New Radio) and related 5G standards, among others.

Some of the aforementioned signaling or protocol types are built upon PCIe, and thus add additional features to PCIe interfaces. Parallel, serial, or combined parallel/serial types of interfaces can also apply to the examples herein. Although many of the examples herein employ PCIe as the exemplary fabric type for coupling to peripheral devices, it should be understood that others can instead be used. PCIe is a high-speed serial computer expansion bus standard, and typically has multi-lane point-to-point connections among hosts and component devices, or among peer devices. PCIe typically has multi-lane serial links connecting individual devices to a root complex. A PCIe communication fabric can be established using various switching circuitry and control architectures described herein.

The components of the various computing systems herein can be included in one or more physical enclosures, such as rack-mountable modules which can further be included in shelving or rack units. A quantity of components can be inserted or installed into a physical enclosure, such as a modular framework where modules can be inserted and removed according to the needs of a particular end user. An enclosed modular system can include physical support structure and enclosure that includes circuitry, printed circuit boards, semiconductor systems, and structural elements. The modules that comprise the components may be insertable and removable from a rackmount style or rack unit (U) type of enclosure. It should be understood that the components herein can be included in any physical mounting environment, and need not include any associated enclosures or rackmount elements.

The functional block diagrams, operational scenarios and sequences, and flow diagrams provided in the Figures are representative of exemplary systems, environments, and methodologies for performing novel aspects of the disclosure. While, for purposes of simplicity of explanation, methods included herein may be in the form of a functional diagram, operational scenario or sequence, or flow diagram, and may be described as a series of acts, it is to be understood and appreciated that the methods are not limited by the order of acts, as some acts may, in accordance therewith, occur in a different order and/or concurrently with other acts from that shown and described herein. For example, those skilled in the art will understand and appreciate that a method could alternatively be represented as a series of interrelated states or events, such as in a state diagram. Moreover, not all acts illustrated in a methodology may be required for a novel implementation.

The descriptions and figures included herein depict specific implementations to teach those skilled in the art how to make and use the best option. For the purpose of teaching inventive principles, some conventional aspects have been simplified or omitted. Those skilled in the art will appreciate variations from these implementations that fall within the scope of the present disclosure. Those skilled in the art will also appreciate that the features described above can be combined in various ways to form multiple implementations. As a result, the invention is not limited to the specific implementations described above, but only by the claims and their equivalents.

What is claimed is:

1. A method comprising:
receiving an indication of a peripheral device available for data processing and located at a first computing device;
receiving a request from a second computing device to access the peripheral device;
based on the request, directing the second computing device to instantiate an emulated version of the peripheral device as a local device installed locally to the second computing device by at least triggering an entry point process in a peripheral interconnect interface of the second computing device that emulates a hardware plugging process for the peripheral device with the peripheral interconnect interface; and
routing data traffic from the second computing device for processing by the peripheral device at the first computing device.

2. The method of claim 1 further comprising:
receiving a second indication of a second peripheral device available for processing and located at the second computing device,;
receiving a second request from the first computing device to access the second peripheral device;
based on the second request, directing the first computing device to emulate the second peripheral device as a second local device installed into the first computing device; and
routing data traffic from the first computing device to the second computing device for processing by the second peripheral device.

3. The method of claim 1 further comprising:
receiving a second indication of a second peripheral device available for processing and located at the first computing device;
receiving a second request from the first computing device to access the second peripheral device;
based on the second request, assigning the second peripheral device to the first computing device; and
routing data traffic from the first computing device to the second peripheral device at the first computing device.

4. The method of claim 1 further comprising:
maintaining, at a server rebalancing system, a data structure identifying peripheral devices available for processing, including the peripheral device;
providing a list from the server rebalancing system to networked computing devices identifying the peripheral devices available for processing;
based on directing the second computing device to emulate the second peripheral device as a local device, updating the data structure to indicate the peripheral device is assigned to the second computing device; and
routing the data traffic based on the data structure, wherein the peripheral devices are identified in the data structure by at least device-specific network ports and addresses which are included in header portions added into the data traffic.

5. The method of claim 4 further comprising:
receiving, at the server rebalancing system, a notification regarding the detachment of the peripheral device from the second computing device; and
based on the notification, updating the data structure to disassociate the peripheral device from the second computing device and indicate the peripheral device is available for processing.

6. The method of claim 1 further comprising:
discovering, via a peripheral interface, a second peripheral device available for processing;
receiving a second request from the second computing device to access the second peripheral device;
based on the second request, directing the second computing system to emulate local installation of the second peripheral device at the second computing device;
converting messaging received from the second computing device from a first data format to a second data format; and
routing the messaging in the second data format to the second peripheral device via the peripheral interface.

7. The method of claim 1, wherein the second computing device is configured to:
intercept traffic to the peripheral interconnect interface for the emulated version of peripheral device issued by applications executed by the second computing device;
translate the traffic into translated traffic comprising a network format suitable for the network interface of the second computing device; and
route the translated traffic over a network stack of the second computing device to reach the peripheral device over the network interface instead of over the peripheral interconnect interface.

8. The method of claim 1 further comprising:
obtaining, at the second computing device via a network interface, the indication of the peripheral device available for processing;
issuing the request from the second computing device to access the peripheral device;
based on a response to the request received at the second computing device, emulating the peripheral device as the local device installed into the second computing device; and
issuing the data traffic for processing by the peripheral device from the second computing via the network interface.

9. The method of claim 1 further comprising:
issuing, from the first computing device via a network interface, the indication that the peripheral device located at the first computing device is available for processing;
receiving, at the first computing device via the network interface, a second indication that the peripheral device is assigned to the second computing device;
receiving, at the first computing device via the network interface, the data traffic from the second computing device for processing by the peripheral device; and
providing, from the first computing device via the network interface, a result of processing the data traffic by the peripheral device.

* * * * *